(12) United States Patent
Ikeda et al.

(10) Patent No.: US 12,366,531 B2
(45) Date of Patent: Jul. 22, 2025

(54) DATA GENERATION METHOD, FLUORESCENCE OBSERVATION SYSTEM, AND INFORMATION PROCESSING APPARATUS

(71) Applicant: SONY GROUP CORPORATION, Tokyo (JP)

(72) Inventors: Kenji Ikeda, Tokyo (JP); Hirokazu Tatsuta, Tokyo (JP); Kazumasa Sato, Tokyo (JP); Tetsuro Kuwayama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 95 days.

(21) Appl. No.: 18/258,279

(22) PCT Filed: Dec. 15, 2021

(86) PCT No.: PCT/JP2021/046262
§ 371 (c)(1),
(2) Date: Jun. 19, 2023

(87) PCT Pub. No.: WO2022/138374
PCT Pub. Date: Jun. 30, 2022

(65) Prior Publication Data
US 2024/0053267 A1 Feb. 15, 2024

(30) Foreign Application Priority Data
Dec. 24, 2020 (JP) .................................. 2020-215441

(51) Int. Cl.
*G01N 21/64* (2006.01)

(52) U.S. Cl.
CPC . *G01N 21/6456* (2013.01); *G01N 2021/6421* (2013.01)

(58) Field of Classification Search
CPC ....... G01N 21/6456; G01N 2021/6421; G02B 21/06
See application file for complete search history.

(56) References Cited

U.S. PATENT DOCUMENTS

| 2004/0113059 A1* | 6/2004 | Kawano | G02B 21/0048 250/234 |
| 2015/0292862 A1* | 10/2015 | Sataka | G01J 3/2803 356/326 |

(Continued)

FOREIGN PATENT DOCUMENTS

| JP | 2020-112378 A | 7/2020 |
| WO | 2019/230878 A1 | 12/2019 |

OTHER PUBLICATIONS

International Search Report and Written Opinion of PCT Application No. PCT/JP2021/046262, issued on Feb. 15, 2022, 09 pages of ISRWO.

*Primary Examiner* — David P Porta
*Assistant Examiner* — Mamadou Faye
(74) *Attorney, Agent, or Firm* — CHIP LAW GROUP

(57) ABSTRACT

A data generation method according to an embodiment includes: an imaging step (S10) of capturing, for each of lines for scanning an imaging target, a plurality of fluorescence images generated by the imaging target for a respective plurality of fluorescence wavelengths and acquiring data of the captured plurality of fluorescence images in arrangement order of the lines and a rearrangement step (S12) of changing the arrangement order of the data of the plurality of fluorescence images acquired in the imaging step from the arrangement order of the lines to arrangement order of for each of the plurality of fluorescence wavelengths.

18 Claims, 22 Drawing Sheets

(56) References Cited

U.S. PATENT DOCUMENTS

2020/0200671 A1\* 6/2020 Yamane .................. G06F 18/23
2020/0394455 A1\* 12/2020 Lee ........................ G06N 20/00
2021/0127948 A1\* 5/2021 Pang .................. A61B 1/00009

\* cited by examiner

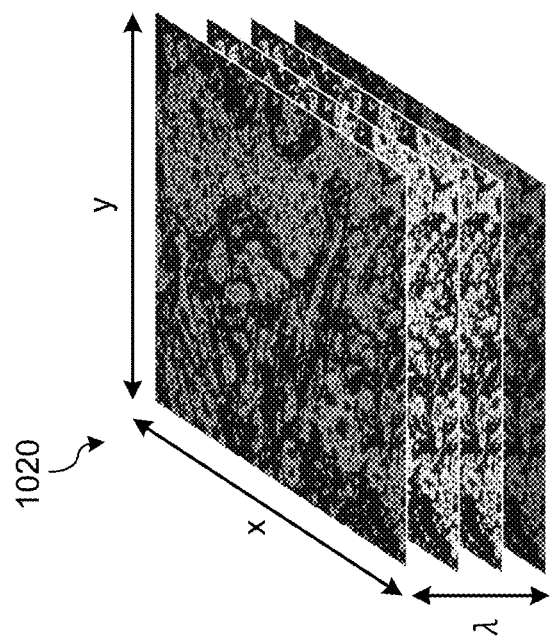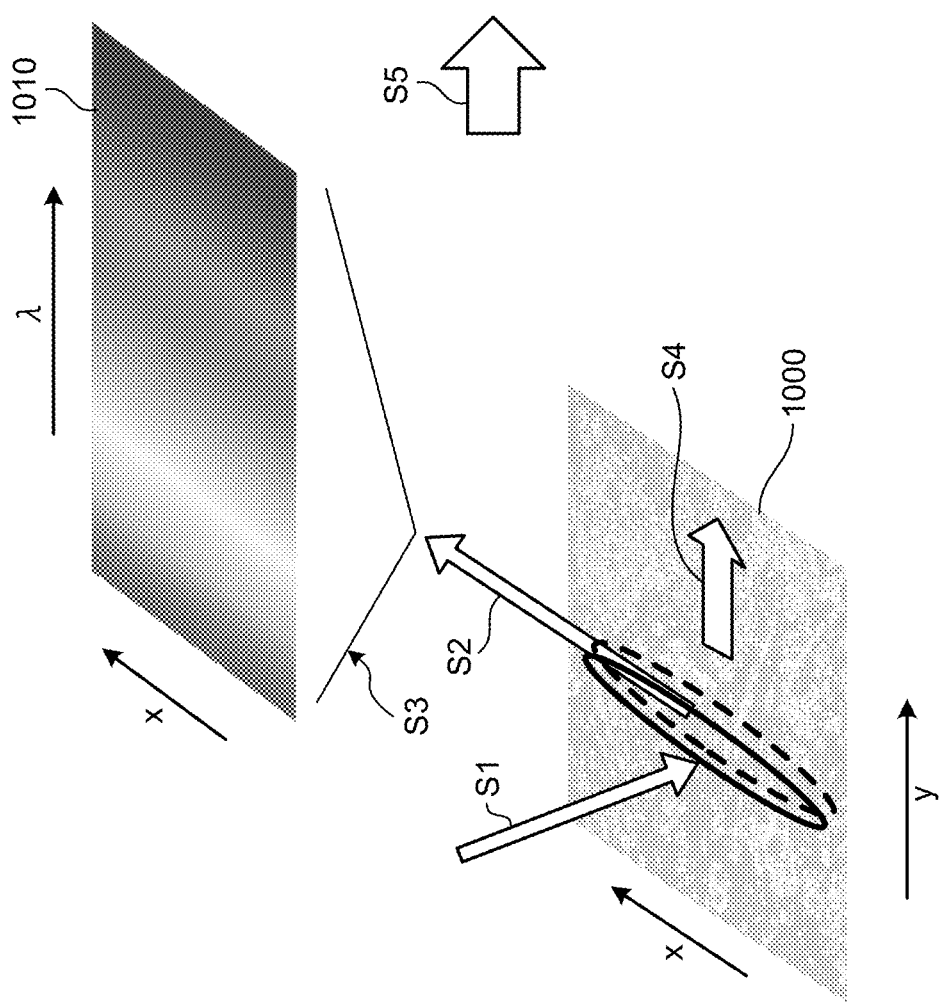
FIG.1

| ILLUMINATION LINE | CONFIGURATION EXAMPLE 1 | CONFIGURATION EXAMPLE 2 | CONFIGURATION EXAMPLE 3 |
|---|---|---|---|
| Ex1 | 405nm | 405nm, 532nm | 405nm, 532nm, 488nm, 638nm |
| Ex2 | 488nm | 488nm, 638nm | - |
| Ex3 | 532nm | - | - |
| Ex4 | 638nm | - | - |

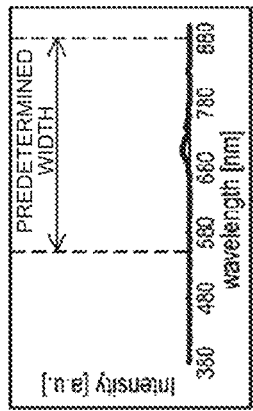
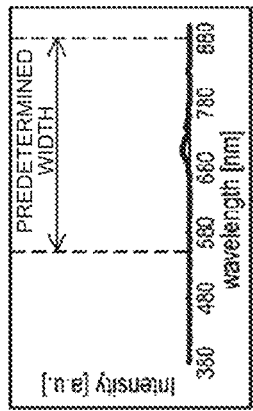
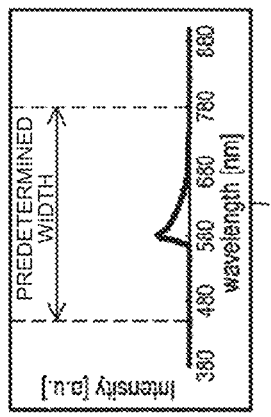
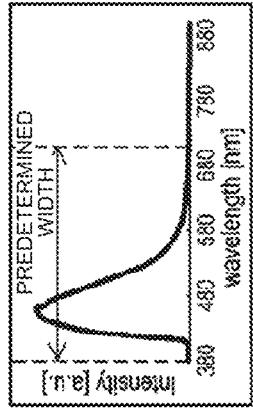
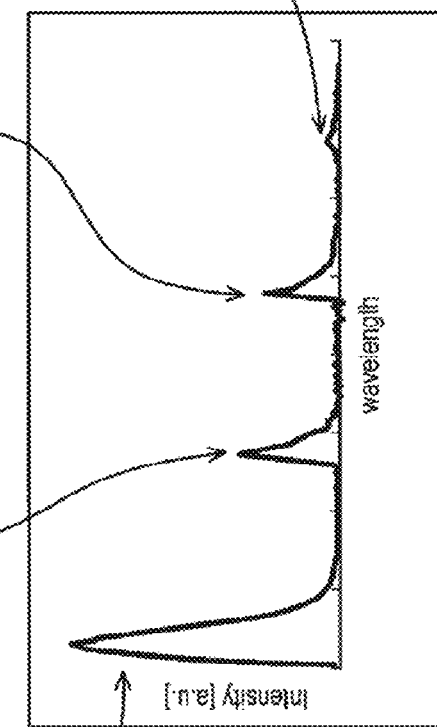

FIG.23

| HEADER | | | |
|---|---|---|---|
| # | ITEM | DATA TYPE | DATA LENGTH [byte] |
| 1 | IDENTIFIER | char | 4 |
| 2 | VERSION | int | 4 |
| 3 | WIDTH[pixel] | int | 4 |
| 4 | HEIGHT[pixel] | int | 4 |
| 5 | NUMBER OF WAVELENGTH CHs | int | 4 |
| 6 | BLANK | int | 4 |
| WAVELENGTH PORTION | | | |
| # | ITEM | DATA TYPE | DATA LENGTH [byte] |
| 1 | MINIMUM WAVELENGTH | int | 4 |
| ... | | | |
| n | MAXIMUM WAVELENGTH | int | 4 |
| MAIN BODY PORTION | | | |
| #[LINE, PIXEL, WAVELENGTH CH] | ITEM | DATA TYPE | DATA LENGTH [byte] |
| 1,1,1 | MINIMUM WAVELENGTH | float | 4 |
| ... | | | |
| 1,1,n | MAXIMUM WAVELENGTH | float | 4 |
| 1,2,1 | MINIMUM WAVELENGTH | float | 4 |
| ... | | | |
| 1,2,n | MAXIMUM WAVELENGTH | float | 4 |
| ... | | | |
| 1,2440,1 | MINIMUM WAVELENGTH | float | 4 |
| ... | | | |
| 1,2440,n | MAXIMUM WAVELENGTH | float | 4 |
| ... | | | |
| 610,2440,n | MAXIMUM WAVELENGTH | float | 4 |

FIG.24

| HEADER | | | |
|---|---|---|---|
| # | ITEM | DATA TYPE | DATA LENGTH [byte] |
| 1 | IDENTIFIER | char | 4 |
| 2 | VERSION | int | 4 |
| 3 | WIDTH[pixel] | int | 4 |
| 4 | HEIGHT[pixel] | int | 4 |
| 5 | NUMBER OF WAVELENGTH CHs | int | 4 |
| 6 | BLANK | int | 4 |
| WAVELENGTH PORTION | | | |
| # | ITEM | DATA TYPE | DATA LENGTH [byte] |
| 1 | MINIMUM WAVELENGTH | int | 4 |
| | ... | | |
| n | MAXIMUM WAVELENGTH | int | 4 |
| SCALING FACTOR | | | |
| # | ITEM | DATA TYPE | DATA LENGTH [byte] |
| 1 | MINIMUM WAVELENGTH | float | 4 |
| | ... | | |
| n | MAXIMUM WAVELENGTH | float | 4 |
| MAIN BODY PORTION | | | |
| #[LINE, PIXEL, WAVELENGTH CH] | ITEM | DATA TYPE | DATA LENGTH [byte] |
| 1,1,1 | MINIMUM WAVELENGTH | ushort | 2 |
| | ... | | |
| 1,2440,1 | MINIMUM WAVELENGTH | ushort | 2 |
| 2,1,1 | MINIMUM WAVELENGTH | ushort | 2 |
| | ... | | |
| 2,2440,1 | MINIMUM WAVELENGTH | ushort | 2 |
| | ... | | |
| 610,2440,1 | MINIMUM WAVELENGTH | ushort | 2 |
| | ... | | |
| 1,1,n | MAXIMUM WAVELENGTH | ushort | 2 |
| | ... | | |
| 610,2440,n | MAXIMUM WAVELENGTH | ushort | 2 |

DATA GENERATION METHOD, FLUORESCENCE OBSERVATION SYSTEM, AND INFORMATION PROCESSING APPARATUS

CROSS REFERENCE TO RELATED APPLICATIONS

This application is a U.S. National Phase of International Patent Application No. PCT/JP2021/046262 filed on Dec. 15, 2021, which claims priority benefit of Japanese Patent Application No. JP 2020-215441 filed in the Japan Patent Office on Dec. 24, 2020. Each of the above-referenced applications is hereby incorporated herein by reference in its entirety.

FIELD

The present disclosure relates to a data generation method, a fluorescence observation system, and an information processing apparatus.

BACKGROUND

In the diagnosis of a pathological image, a pathological image diagnosis method by fluorescent staining has been proposed as a method excellent in quantitatively and polychromaticity. The fluorescence technique is advantageous in that multiplexing is easier than colored staining and detailed diagnostic information can be obtained. Even in fluorescence imaging other than pathological diagnosis, an increase in the number of colors makes it possible to examine various antigens developed in a sample at a time.

As a configuration for realizing such a pathological image diagnosis method by fluorescent staining, a fluorescence observation device using a line spectrometer has been proposed (for example, Patent Literature 1). The line spectrometer irradiates a fluorescently stained pathological specimen with linear line illumination, disperses, with the spectrometer, fluorescence excited by the line illumination, and images the pathological specimen. Captured image data obtained by the imaging is sequentially output, for example, in a line direction by the line illumination and the output is sequentially repeated in a wavelength direction by the spectroscopy, whereby the captured image data is continuously output without interruption.

In the fluorescence observation device, the imaging of the pathological specimen is performed by scanning the pathological specimen in a direction perpendicular to the line direction by the line illumination, whereby spectral information concerning the pathological specimen based on the captured image data can be treated as two-dimensional information.

CITATION LIST

Patent Literature

Patent Literature 1: WO 2019/230878 A

SUMMARY

Technical Problem

The captured image data captured and generated by the line spectrometer is subjected to image processing, waveform separation processing for a spectral spectrum waveform, and the like in a later stage. It is desired to generate captured image data that can be more easily applied to the processing in the later stage and can be processed at higher speed.

An object of the present disclosure is to provide a data generation method, a fluorescence observation system, and an information processing apparatus capable of more easily and quickly processing a captured image captured using a line spectrometer.

Solution to Problem

For solving the problem described above, a data generation method according to one aspect of the present disclosure comprises, an imaging step of imaging, for each of lines for scanning an imaging target, a plurality of fluorescence images generated by the imaging target for each of a plurality of fluorescence wavelengths and acquiring data of the captured plurality of fluorescence images in arrangement order of the lines; and a rearrangement step of changing the arrangement order of the data of the plurality of fluorescence images acquired in the imaging step from the arrangement order of the lines to an arrangement order for each of the plurality of fluorescence wavelengths.

BRIEF DESCRIPTION OF DRAWINGS

FIG. 1 is a schematic diagram for explaining line spectroscopy applicable to an embodiment.

FIGS. 13A, 13B, 13C, 13D, and 13E are schematic diagrams for explaining coupling of fluorescence spectra by an image forming section.

FIG. 23 is a diagram illustrating an example of a data format according to the existing technique.

FIG. 24 is a diagram illustrating an example of a data format according to an embodiment.

DESCRIPTION OF EMBODIMENTS

Figure 2:
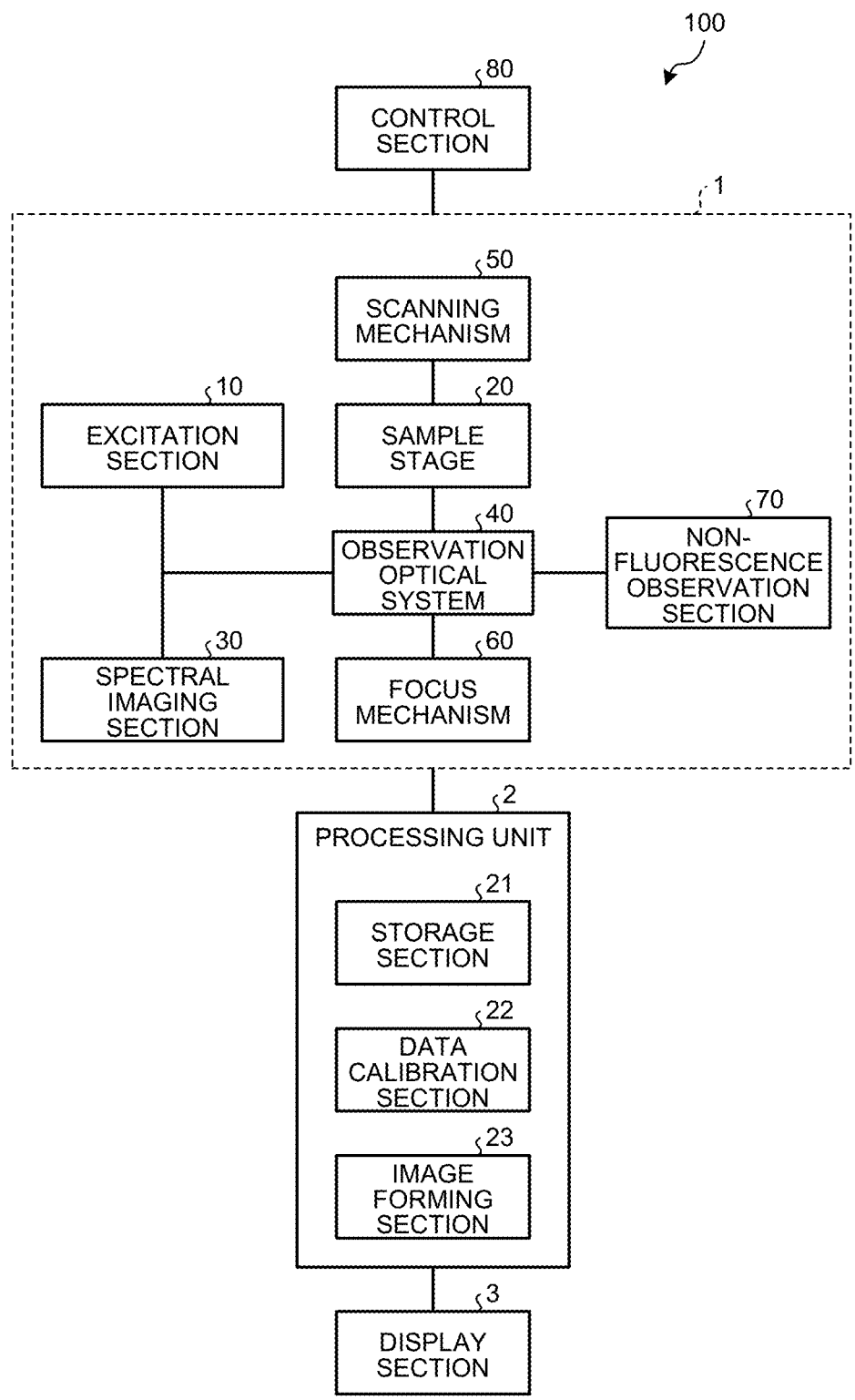
FIG. 2 is a functional block diagram of an example for explaining functions of a fluorescence observation device applicable to the embodiment.

An embodiment of the present disclosure is explained in detail below with reference to the drawings. Note that, in the embodiment explained below, redundant explanation is omitted by denoting the same parts with the same reference numerals and signs.

The embodiment of the present disclosure is explained in detail below according to the following order.

1. Overview of line spectroscopy
2. Technique applicable to the embodiment of the present disclosure
2-1. Configuration example for realizing the line spectroscopy
2-2. Processing example by the line spectroscopy
2-3. Wavelength coupling
2-4. Hardware configuration example
3. Embodiment of the present disclosure
3-1. Overview of the embodiment
3-2. Acquired data example and rearrangement of data
3-3. Wavelength coupling
3-3-1. Wavelength coupling by an existing technique
3-3-2. Wavelength coupling according to the embodiment
3-3-3. Flow of processing according to the embodiment
3-4. Data format example
3-4-1. Data format example by the existing technique
3-4-2. Data format example according to the embodiment
4. Effects according to the embodiment 1. Overview of Line Spectroscopy Prior to explanation of the embodiment of the present disclosure, line spectroscopy is schematically explained to facilitate understanding. FIG. 1 is a schematic diagram for explaining line spectroscopy applicable to the embodiment. A fluorescently stained pathological specimen 1000 is irradiated with linear excitation light by, for example, laser light with line illumination (step S1). In an example illustrated in FIG. 1, the pathological specimen 1000 is irradiated with the excitation light in a line shape parallel to an x direction.

In the pathological specimen 1000, a fluorescent substance by fluorescent staining is excited by irradiation of excitation light and linearly emits fluorescence (step S2). This fluorescence is dispersed by a spectrometer (step S3) and imaged by a camera. Here, an imaging element of the camera has a configuration in which pixels are arrayed in a two-dimensional lattice shape including pixels aligned in a row direction (referred to as x direction) and pixels aligned in a column direction (referred to as y direction). Captured image data 1010 has structure including position information in a line direction in the x direction and information concerning a wavelength λ by the spectroscopy in the y direction.

When imaging by the excitation light irradiation of one line ends, for example, the pathological specimen 1000 is moved by a predetermined distance in the y direction (step S4) and the next imaging is performed. By this imaging, image data 1010 in the next line in the y direction is acquired. By repeatedly executing this operation a predetermined number of times, it is possible to acquire two-dimensional information concerning the fluorescence emitted from the pathological specimen 1000 for the wavelength λ (step S5). Data obtained by stacking the two-dimensional information at the wavelength λ in the direction of the wavelength λ is referred to as spectral data cube 1020.

In the example illustrated in FIG. 1, the spectral data cube 1020 has structure including two-dimensional information concerning the pathological specimen 1000 in the x direction and the y direction and including information concerning the wavelength λ in the height direction (the depth direction). By forming the spectral information by the pathological specimen 1000 in such a data configuration, it is possible to easily execute a two-dimensional analysis for the pathological specimen 1000.

2. Technique Applicable to the Embodiment of Present Disclosure

Subsequently, a technique applicable to the embodiment of the present disclosure is explained.

(2-1. Configuration Example for Realizing the Line Spectroscopy)

First, a configuration example for realizing the line spectroscopy explained above is explained. FIG. 2 is a functional block diagram of a fluorescence observation device applicable to the embodiment. In FIG. 2, the fluorescence observation device 100 includes an observation unit 1, a processing unit 2, and a display section 3.

The observation unit 1 includes an excitation section 10, a sample stage 20, a spectral imaging section 30, an observation optical system 40, a scanning mechanism 50, a focus mechanism 60, and a non-fluorescence observation section 70.

The excitation section 10 irradiates a pathological specimen with a plurality of kind of illumination having different wavelengths disposed in eccentric axial and parallel. The sample stage 20 is a stage that supports the pathological specimen and can be moved by the scanning mechanism 50 in a direction perpendicular to the direction of linear light by the line illumination. The spectral imaging section 30 includes a spectrometer and acquires a fluorescence spectrum (spectral data) of the pathological specimen linearly excited by the line illumination. That is, the observation unit 1 functions as a line spectrometer that acquires spectral data corresponding to the line illumination.

The observation unit 1 also functions as an imaging section that captures, line by line, a plurality of fluorescence images generated by an imaging target (a pathological specimen) for each of a plurality of fluorescence wavelengths and acquires data of the captured plurality of fluorescence images in arrangement order of lines.

Here, eccentric axial and parallel means that the plurality of line illuminations are eccentric axial and parallel. Eccentric axial mean absence on the same axis and the distance between the axes is not particularly limited. Parallel is not limited to parallel in a strict sense and includes a state of being substantially parallel. For example, there may be deviation from a parallel state due to distortion and manufacturing tolerance deriving from an optical system such as a lens. This case is also regarded as parallel.

The excitation section 10 and the spectral imaging section 30 are connected to the sample stage 20 via an observation optical system 40 including an objective lens and the like explained below. The observation optical system 40 has a function of following an optimum focus with the focus mechanism 60. The non-fluorescence observation section 70 for dark field observation, bright field observation, and the like may be connected to the observation optical system 40.

The fluorescence observation device 100 may be connected to a control section 80 that performs control for a light source and a shutter in the excitation section 10, movement control for the XY stage by the scanning mechanism 50, camera control in the spectral imaging section 30, control for a detector and a Z stage in the focus mechanism 60, camera control in the non-fluorescence observation section 70, and the like.

The processing unit 2 includes a storage section 21, a data calibration section 22, and an image forming section 23.

The storage section 21 includes a nonvolatile storage medium such as a hard disk drive or a flash memory and a storage control section that controls writing and reading of data to and from the storage medium. The storage section 21 stores spectral data indicating a correlation between wavelengths of light emitted by each of the plurality of line illuminations included in the excitation section 10 and fluorescence received by the camera of the spectral imaging section 30. The storage section 21 stores in advance information indicating a standard spectrum of autofluorescence concerning a sample (a pathological specimen) to be observed and information indicating a standard spectrum of a single dye for staining the sample.

The data calibration section 22 configures spectral data stored in the storage section 21 based on a captured image captured by the camera of the spectral imaging section 30. The image forming section 23 forms a fluorescence image of the sample based on the spectral data and an interval $\Delta y$ of the plurality of line illuminations irradiated by the excitation section 10.

The display section 3 causes a display to display, for example, an image based on the fluorescence image formed by the image forming section 23.

Figure 3:
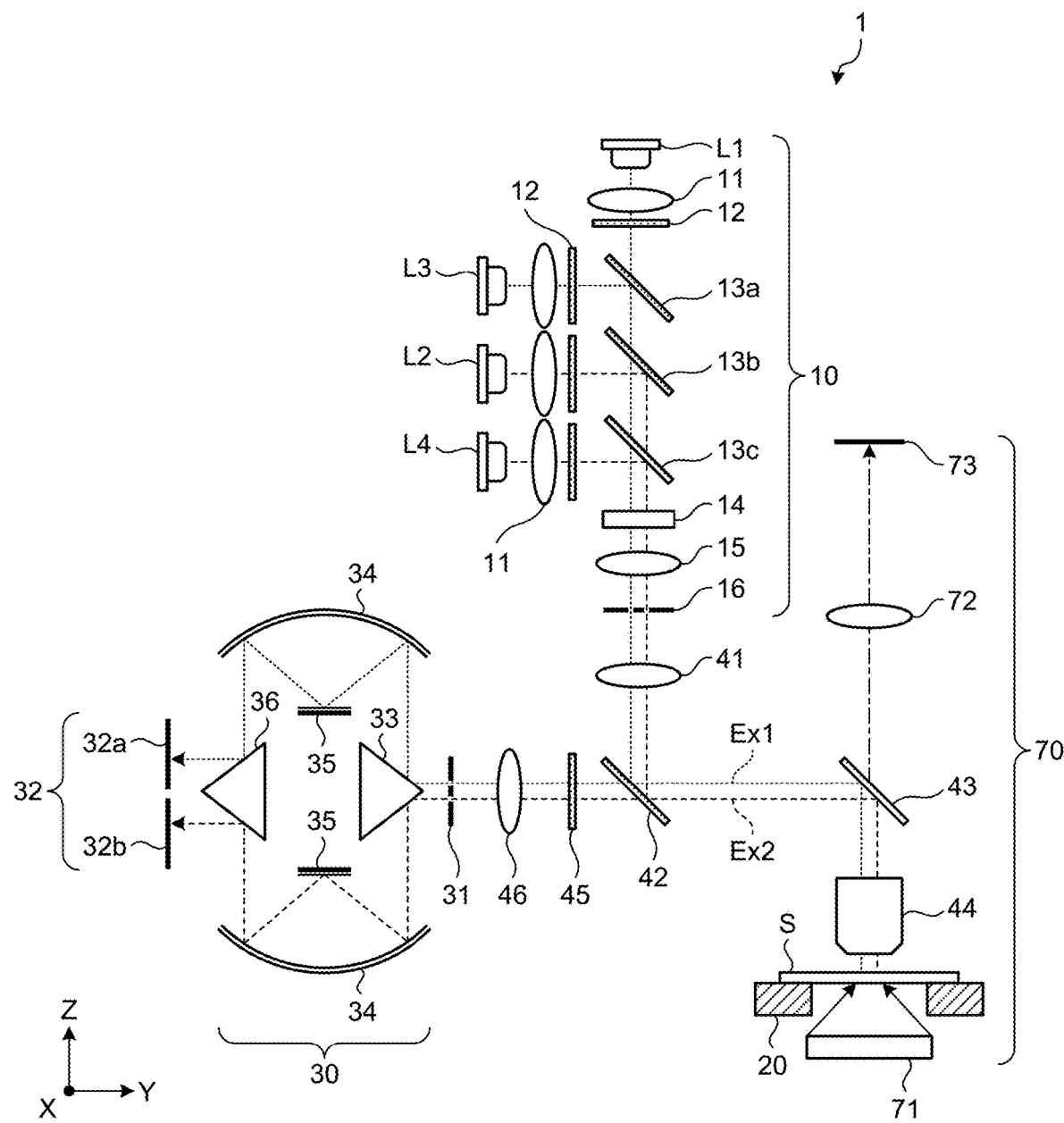
FIG. 3 is a schematic diagram illustrating a configuration of an example of an observation unit applicable to the embodiment.

FIG. 3 is a schematic diagram illustrating a configuration of an example of the observation unit 1 applicable to the embodiment. In the following explanation, it is assumed that the excitation section 10 includes two line illuminations Ex1 and Ex2 that respectively emit lights having two wavelengths. For example, the line illumination Ex1 emits light having a wavelength of 405 nm and light having a wavelength of 561 nm and the line illumination Ex2 emits light having a wavelength of 488 nm and light having a wavelength of 645 nm.

The excitation section 10 includes a plurality of (four in this example) excitation light sources L1, L2, L3, and L4. The excitation light sources L1 to L4 are configured by laser light sources that output laser lights respectively having wavelengths of 405 nm, 488 nm, 561 nm, and 645 nm.

The excitation section 10 further includes a plurality of collimator lenses 11 and a plurality of laser line filters 12 corresponding to the excitation light sources L1 to L4, dichroic mirrors 13a, 13b, and 13c, a homogenizer 14, a condenser lens 15, and an incident slit 16.

The laser light emitted from the excitation light source L1 and the laser light emitted from the excitation light source L3 are collimated by the collimator lens 11 and thereafter transmitted through the laser line filter 12 for cutting skirts of respective wavelength bands and made coaxial by the dichroic mirror 13a. The two laser lights made coaxial are further beam-shaped by the homogenizer 14 such as a fly-eye lens and the condenser lens 15 to be line illumination Ex1.

Similarly, the laser light emitted from the excitation light source L2 and the laser light emitted from the excitation light source L4 are made coaxial by the dichroic mirrors 13b and 13c and converted into line illumination to be line illumination Ex2 that is eccentric axial with the line illumination Ex1. The line illuminations Ex1 and Ex2 form eccentric axial line illuminations (primary images) separated by a distance $\Delta y$ in the incident slit 16 (slit conjugate) having a plurality of slits through which the line illumination Ex1 and Ex2 can pass.

A sample S on the sample stage 20 is irradiated with the primary image via the observation optical system 40. The observation optical system 40 includes a condenser lens 41, dichroic mirrors 42 and 43, an objective lens 44, a band pass filter 45, and a condenser lens 46. The line illuminations Ex1 and Ex2 are collimated by the condenser lens 41 paired with the objective lens 44, reflected by the dichroic mirrors 42 and 43, transmitted through the objective lens 44, and applied to the sample S on the sample stage 20.

Figure 4:
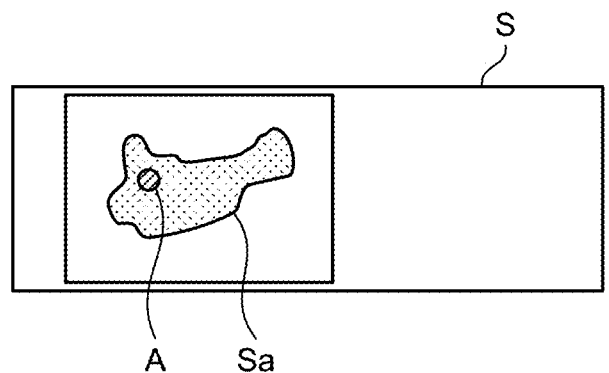
FIG. 4 is a schematic diagram illustrating an example of a sample.

FIG. 4 is a schematic diagram illustrating an example of the sample S. FIG. 4 illustrates a state in which the sample S is viewed from an irradiation direction of the line illuminations Ex1 and Ex2 that are excitation light. The sample S is typically configured by a slide including an observation target Sa such as a tissue section illustrated in FIG. 4 but naturally may be other slides. The sample S (the observation target Sa) is stained with a plurality of fluorescent dyes. The observation unit 1 enlarges the sample S at desired magnification and observes the sample S.

Figure 5:
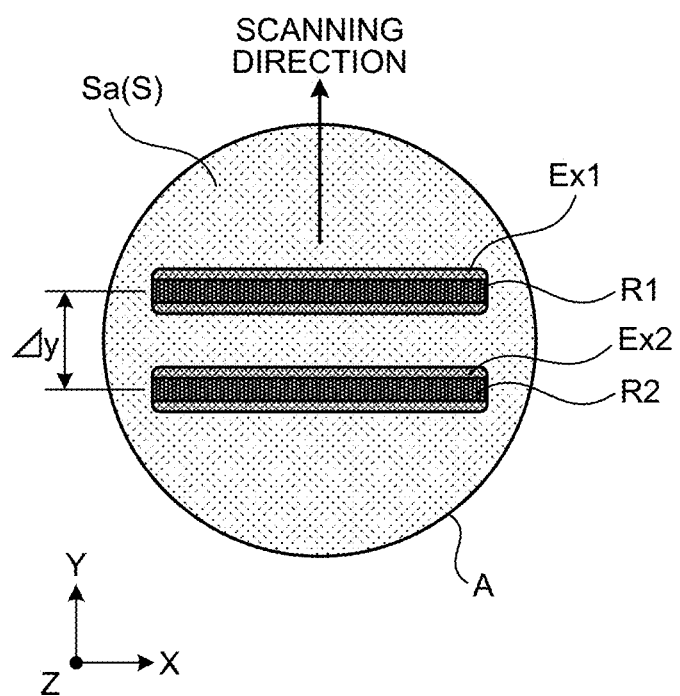
FIG. 5 is a schematic view enlarging and illustrating a region where the sample is irradiated with line illumination.

In FIG. 4, a region A includes the line illuminations Ex1 and Ex2 with which sample S is irradiated. FIG. 5 is a schematic view enlarging and illustrating the region A in which the sample S is irradiated with the line illuminations Ex1 and Ex2. In an example illustrated in FIG. 5, the two line illuminations Ex1 and Ex2 are disposed in the region A and imaging areas R1 and R2 of the spectral imaging section 30 are disposed to overlap the line illuminations Ex1 and Ex2. The two line illuminations Ex1 and Ex2 are respectively parallel to a Z-axis direction and are disposed to be separated from each other by a predetermined distance $\Delta y$ in a Y-axis direction.

The line illuminations Ex1 and Ex2 are formed on the surface of the sample S as illustrated in FIG. 5. Fluorescence excited in the sample S by the line illuminations Ex1 and Ex2 is collected by the objective lens 44, reflected by the dichroic mirror 43, transmitted through the dichroic mirror 42 and the band pass filter 45 that cuts off the excitation light, collected again by the condenser lens 46, and made incident on the spectral imaging section 30.

The spectral imaging section 30 includes an observation slit 31, an imaging element 32, a first prism 33, a mirror 34, a diffraction grating 35 (a wavelength dispersion element), and a second prism 36. In the example illustrated in FIG. 3, the imaging element 32 includes two imaging elements 32a and 32b.

The observation slit 31 is disposed at a condensing point of the condenser lens 46 and includes slit portions as many as excitation lines (two slit portions in this example). Fluorescence spectra deriving from the two excitation lines that have passed through the observation slit 31 are separated by the first prism 33 and respectively reflected on a grating surface of the diffraction grating 35 via the mirror 34 to thereby be further separated into fluorescence spectra having respective excitation wavelengths.

Four fluorescence spectra separated in this way are made incident on the imaging elements 32a and 32b via the mirror 34 and the second prism 36 and are developed as spectral data into spectral data (x, λ) represented by a position x in the line direction and the wavelength λ. The spectral data (x, λ) is a pixel value of a pixel in the position x in the row direction and in the position of the wavelength λ in a row direction among pixels included in the imaging element 32. Note that, in the following explanation, the spectral data (x, λ) is sometimes simply described as spectral data.

Note that a pixel size (nm/Pixel) of the imaging elements 32a and 32b is not particularly limited and is set to, for example, 2 (nm/Pixel) or more and 20 (nm/Pixel) or less. This dispersion value may be realized at a pitch of the diffraction grating 35 or optically or may be realized using hardware binning of the imaging elements 32a and 32b.

Figure 6:
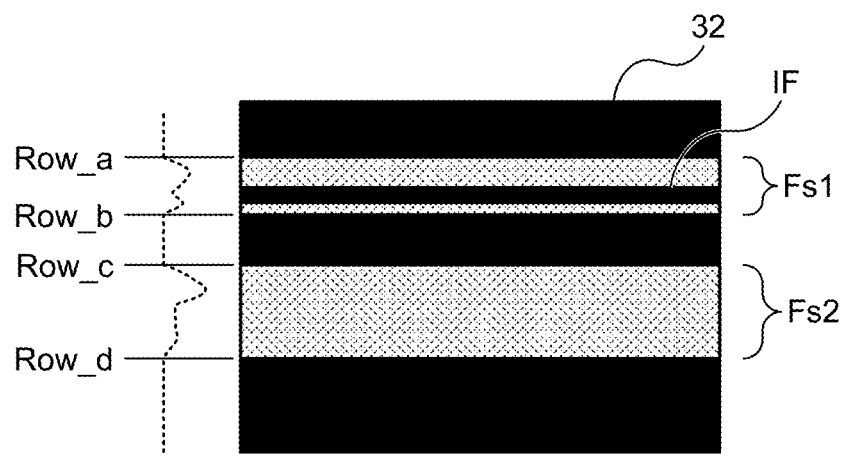
FIG. 6 is a diagram schematically illustrating an example of spectral data received by one imaging element.
Figure 7:
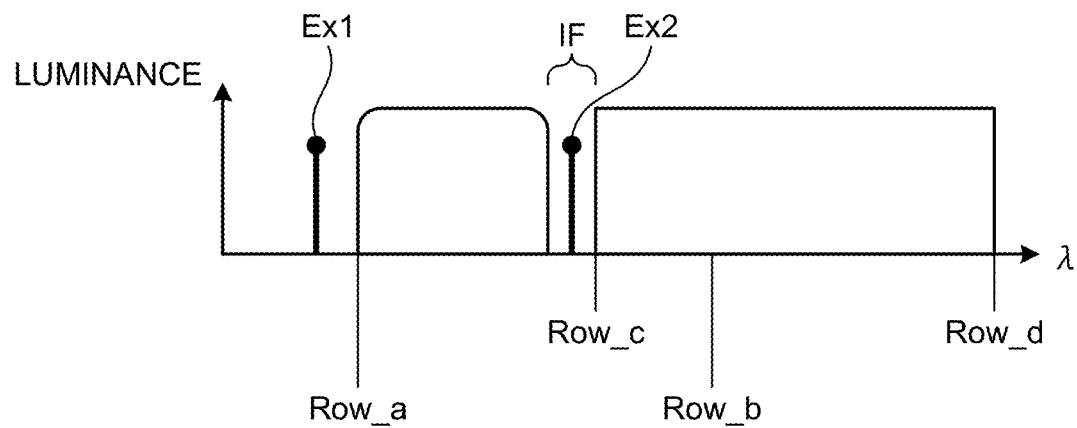
FIG. 7 is a diagram schematically illustrating an example of spectral data received by one imaging element.

FIG. 6 and FIG. 7 are diagrams schematically illustrating examples of the spectral data (x, λ) received by one imaging element 32. A method of acquiring the spectral data (x, λ) in the case in which the imaging element 32 is configured by a single image sensor that receives, in common, fluorescence having passed through the observation slit 31 is explained with reference to FIG. 6 and FIG. 7. In this example, the fluorescence spectra Fs1 and Fs2 excited by the line illuminations Ex1 and Ex2 are finally imaged on the light receiving surface of the imaging element 32 in a state in which the fluorescence spectra Fs1 and Fs2 are shifted by an amount proportional to the distance Δy (see FIG. 5) via a spectroscopic optical system (explained below).

As illustrated in FIG. 6, information obtained from the line illumination Ex1 and information obtained from the line illumination Ex2 are respectively stored in, for example, the storage section 21 as data Row_a and Row_b and as data Row_c and Row_d. FIG. 7 is a diagram in which the data Row_a to Row_d obtained in FIG. 6 are rearranged according to wavelengths λ. As described above, on the imaging element 32, the data Row_a to Row_d do not need to be always arranged in the order of the wavelengths λ. That is, in the imaging element 32, in a column direction (a wavelength λ direction), the wavelengths λ and a pixel position only have to be associated with each other and the wavelengths λ may not be continuous in the column direction.

In the imaging element 32, data other than regions of the data Row_a to Row_d (data of regions painted out in black in the figure) are not read. Consequently, when data read at a full frame is represented as data Row_full, a frame rate of the imaging element 32 can be increased by a factor of Row_full/(Row_b−Row_a+Row_d−Row_c).

Figure 8:
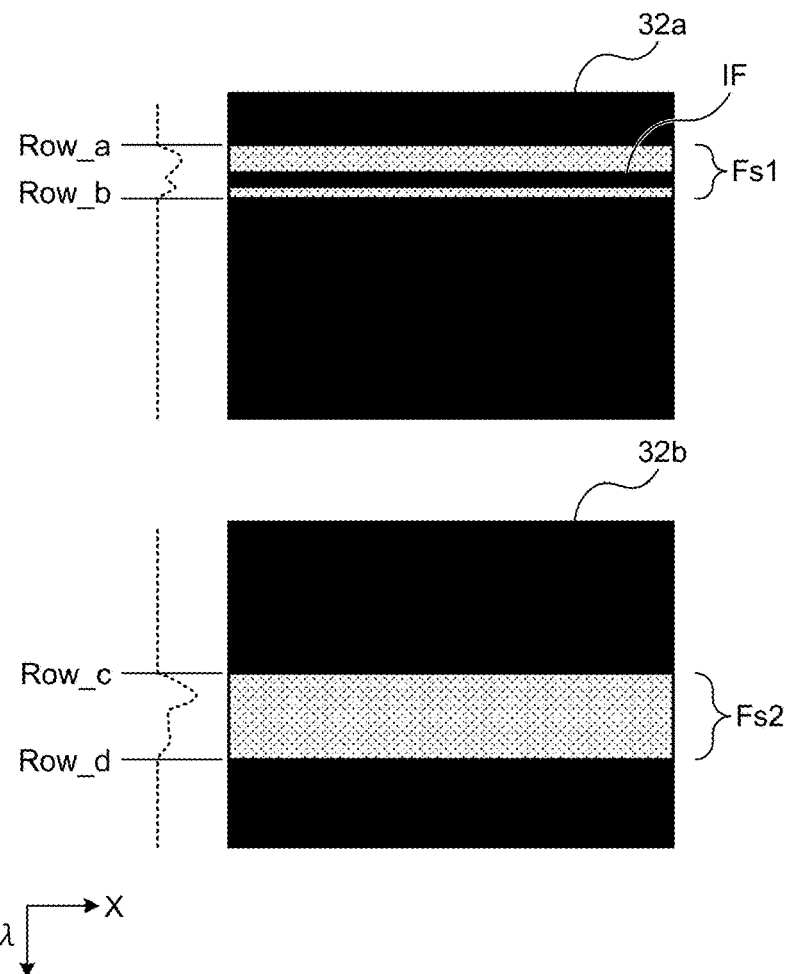
FIG. 8 is a diagram schematically illustrating an example of spectral data received by imaging elements in the case in which a plurality of imaging elements are included.

Note that, as in the example illustrated in FIG. 3, a plurality of imaging elements 32a and 32b respectively capable of receiving the fluorescence having passed through the observation slit 31 may be included. FIG. 8 is a diagram schematically illustrating an example of the spectral data (x, λ) received by the imaging elements 32a and 32b in the case in which the plurality of imaging elements 32a and 32b are included. In this case, the fluorescence spectra Fs1 and Fs2 excited by the line illuminations Ex1 and Ex2 are acquired on the imaging elements 32a and 32b as illustrated in FIG. 8 and are stored in the storage section 21 in association with excitation light.

As illustrated in FIG. 3, the dichroic mirror 42 and the band pass filter 45 are inserted halfway in an optical path to prevent the excitation light (line illuminations Ex1 and Ex2) from reaching the imaging element 32. In this case, an intermittent portion IF occurs in the fluorescence spectrum Fs1 that forms an image on the imaging element 32 (see FIG. 6 and FIG. 7). The frame rate can be further improved by excluding such an intermittent portion IF from a reading region.

The line illuminations Ex1 and Ex2 are not limited to a case in which the line illuminations Ex1 and Ex2 are respectively configured by single wavelengths and may be respectively configured by pluralities of wavelengths. When the line illuminations Ex1 and Ex2 are respectively configured by the pluralities of wavelengths, the fluorescence excited by the line illuminations Ex1 and Ex2 also include pluralities of spectra. In this case, the spectral imaging section 30 includes a wavelength dispersion element for separating the fluorescence into spectra deriving from an excitation wavelength. The wavelength dispersion element is configured by a diffraction grating, a prism, or the like and is typically disposed on an optical path between the observation slit 31 and the imaging element 32.

Note that the sample stage 20 and the scanning mechanism 50 configure an X-Y stage and move the sample S in the X-axis direction and the Y-axis direction in order to acquire a fluorescence image of the sample S. By using the scanning mechanism 50, it is possible to continuously acquire, in the Y-axis direction, dye spectra (fluorescence spectra) spatially separated by the distance Δy on the sample S (the observation target Sa) and excited at different excitation wavelengths.

Figure 9:
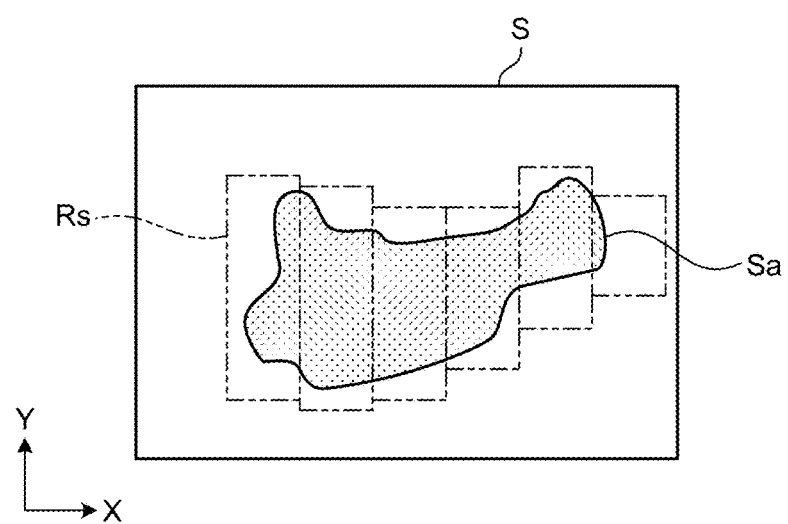
FIG. 9 is a schematic diagram for explaining movement of a sample by an X-Y stage.

FIG. 9 is a schematic diagram for explaining the movement of the sample S by the X-Y stage. In an example illustrated in FIG. 9, an imaging region Rs is divided into a plurality of regions in the X-axis direction and an operation for scanning the sample S in the Y-axis direction and thereafter moving the sample S in the X-axis direction and further performing scanning in the Y-axis direction is repeated. Spectral spectral images deriving from the sample excited by several types of excitation wavelengths can be captured in one scan.

In the scanning mechanism 50, typically, the sample stage 20 is scanned in the Y-axis direction. This is not limited to this example, and the plurality of line illuminations Ex1 and Ex2 may be scanned in the Y-axis direction by a galvano mirror halfway the optical system. Finally, the spectral data cube 1020 by three-dimensional data of a coordinate (X, Y, λ) explained with reference to FIG. 1 is acquired for each of the plurality of line illuminations Ex1 and Ex2. Since three-dimensional data deriving from the line illuminations Ex1 and Ex2 are data in which coordinates are shifted by the distance Δy on the Y axis, the three-dimensional data is corrected and output based on the distance Δy stored in advance or a value of the distance Δy calculated from an output of the imaging element 32.

Referring back to FIG. 3, the non-fluorescence observation section 70 includes a light source 71, a dichroic mirror 43, an objective lens 44, a condenser lens 72, an imaging element 73, and the like. In the non-fluorescence observation section 70, an observation system by dark field illumination is illustrated in the example illustrated in FIG. 3.

The light source 71 is disposed on a side opposed to the objective lens 44 with respect to the sample stage 20 and irradiates the sample S on the sample stage 20 with illumination light from the opposite side of the line illuminations Ex1 and Ex2. In the case of the dark field illumination, the light source 71 illuminates from the outside of an NA (numerical aperture) of the objective lens 44. Light (a dark field image) diffracted by the sample S is imaged by the imaging element 73 via the objective lens 44, the dichroic mirror 43, and the condenser lens 72. By using the dark field illumination, even an apparently transparent sample such as a fluorescently-stained sample can be observed with contrast.

Note that this dark field image may be observed simultaneously with fluorescence and used for real-time focusing. In this case, as an illumination wavelength, a wavelength that does not affect a fluorescence observation only has to be selected. The non-fluorescence observation section 70 is not limited to the observation system that acquires the dark field image and may be configured by an observation system that can acquire a non-fluorescence image such as a bright field image, a phase difference image, a phase image, or an in-line hologram image. For example, as a method of acquiring the non-fluorescence image, various observation methods such as a Schlieren method, a phase difference contrast method, a polarization observation method, and an epi-illumination method can be adopted. The position of an illumination light source is not limited to a position below a stage and may be a position above the stage or around an objective lens. Furthermore, not only a method of performing focus control in real time but also another method such as a prefocus map method of recording focus coordinates (Z coordinates) in advance may be adopted.

Note that, in the above explanation, the line illumination as the excitation light is configured by the two line illuminations Ex1 and Ex2, However, the line illumination is not limited to this and may be configured by three, four, or five or more line illuminations. The respective line illuminations may include pluralities of excitation wavelengths selected such that color separation performance is not degraded as much as possible. Even if there is one line illumination, in an excitation light source configured by a plurality of excitation wavelengths, if the respective excitation wavelengths are recorded in association with Row data obtained by the imaging element, it is possible to obtain a polychromatic spectrum, although separability as high as that in eccentric axial and parallel cannot be obtained.

Figures 10, 11:
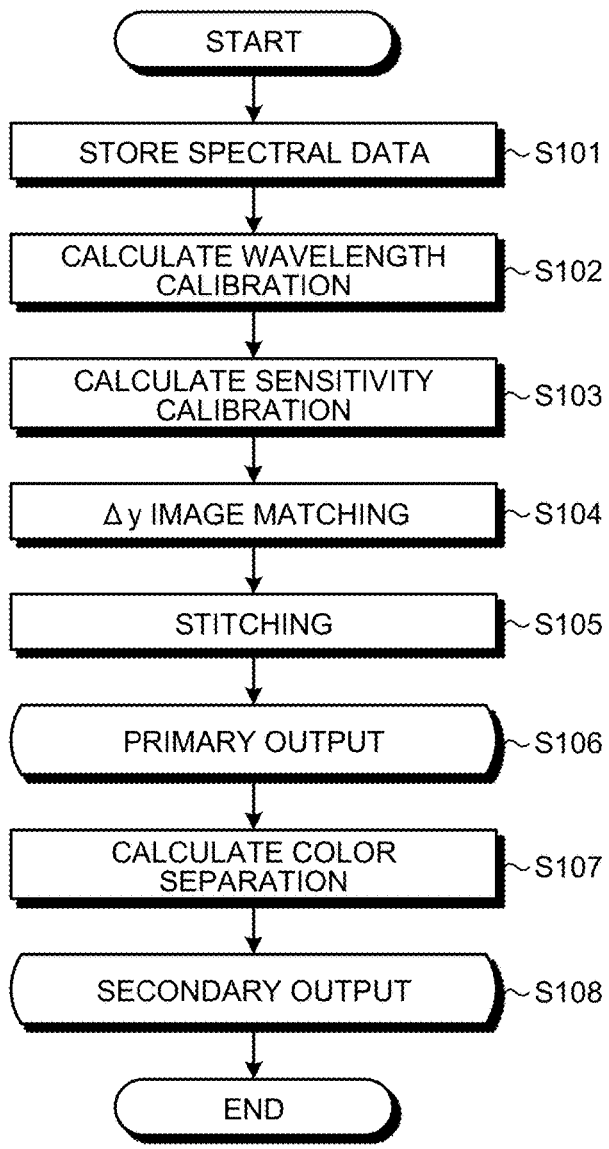
FIG. 10 is a diagram illustrating configuration examples of combinations of line illuminations and excitation lights.
FIG. 11 is a flowchart illustrating an example of processing executed in a processing unit.
Figure 12A:
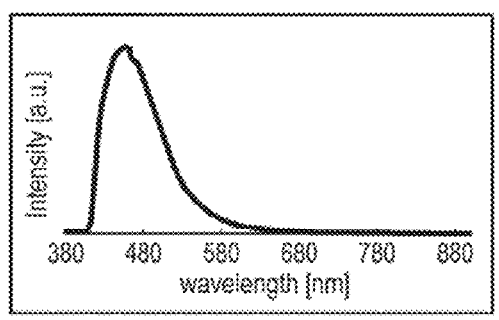
FIGS. 12A, 12B, 12C, and 12D are schematic diagrams illustrating a specific example of a fluorescence spectrum acquired by a spectral imaging section.
Figure 12B:
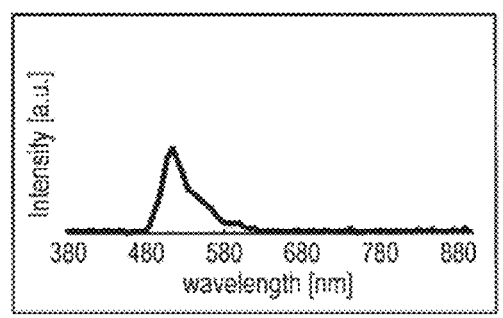
Figure 12C:
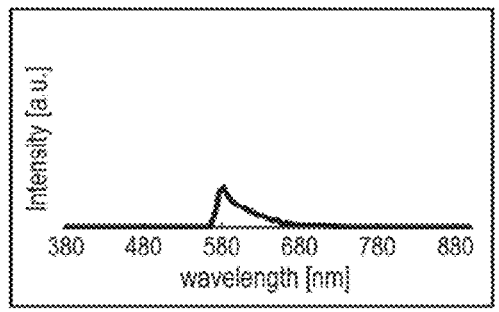
Figure 12D:
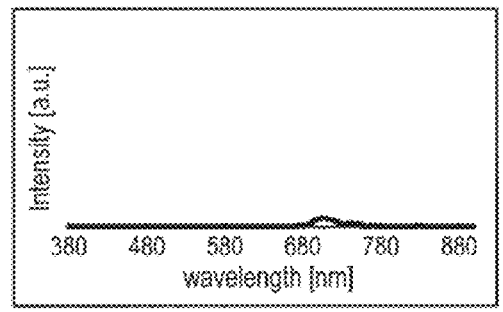

FIG. 10 is a diagram illustrating configuration examples of combinations of line illuminations and excitation lights. In FIG. 10, a configuration example 1 is an example in which independent wavelengths λ=405 (nm), 488 (nm), 532 (nm), and 638 (nm) are respectively allocated to line illuminations Ex1, Ex2, Ex3, and Ex4. A configuration example 2 is an example in which two wavelengths λ=405 (nm) and 532 (nm) and two wavelengths λ=488 (nm) and 638 (nm) are respectively allocated to the line illuminations Ex1 and Ex2. A configuration example 3 is an example in which four wavelengths λ=405 (nm), 532 (nm), 488 (nm), and 638 (nm) are allocated to one line illumination Ex1. The configuration example 2 is applied to the configuration illustrated in FIG. 3 explained above.

(2-2. Processing Example by Line Spectroscopy)

Subsequently, an example of processing by line spectroscopy is explained. FIG. 11 is a flowchart illustrating an example of processing executed in the processing unit 2.

In step S101, the processing unit 2 causes the storage section 21 to acquire and store the spectral data (x, λ) acquired by the spectral imaging section 30. The spectral data (x, λ) acquired here is equivalent to the fluorescence spectra Fs1 and Fs2 in the examples illustrated in FIG. 6 and FIG. 8. In the storage section 21, autofluorescence concerning the sample S and a standard spectrum of a single dye are stored in advance.

The processing unit 2 improves a recording frame rate by extracting, from the storage section 21, only a wavelength region of attention from a pixel array in the wavelength direction of the imaging element 32. The wavelength region of attention is equivalent to, for example, a range of visible light (380 (nm) to 780 (nm)) or a wavelength range determined by a light emission wavelength of a dye that has dyed a sample.

Examples of a wavelength region other than the wavelength region of attention include a sensor region including light having an unnecessary wavelength, a sensor region obviously not including a signal, and a region of an excitation wavelength to be cut by the dichroic mirror 42 or the band pass filter 45 present halfway in the optical path. Further, the wavelength region of attention on the sensor may be switched according to a line illumination situation. For example, when an excitation wavelength used for the line illumination is small, the wavelength region on the sensor is also limited and the frame rate can be increased by the limited wavelength region.

In the next step S102, the processing unit 2 causes the data calibration section 22 to convert the spectral data (x, λ) stored in the storage section 21 from pixel data into the wavelength λ and calibrate all the spectral data to be complemented in a wavelength unit ((nm), (μm), and the like) having a common discrete value and output.

The pixel data (x, λ) is not only neatly aligned in a pixel row of the imaging element 32 but also is distorted by slight inclination or distortion of the optical system. Therefore, for example, when a pixel is converted into a wavelength unit using a light source having a known wavelength, the pixel is converted into different wavelengths ((nm) values) in all x coordinates. Since treatment of data is complicated in this state, the data is converted into data aligned into integers by a complementation method (for example, linear complementation or spline complementation) in step S102.

Further, sensitivity unevenness sometimes occurs in a major axis direction (an X-axis direction) of the line illumination. The sensitivity unevenness is caused by unevenness of illumination or variation in a slit width and leads to luminance unevenness of a captured image. In the next step S103, the processing unit 2 causes the data calibration section 22 to uniformize and output the line illumination using any light source and a representative spectrum (an average spectrum or spectral radiance of the light source) of the light source in order to eliminate the unevenness. By uniformizing the line illumination, a machine difference is eliminated and, in a waveform analysis of a spectrum, it is possible to reduce time and effort for measuring respective component spectra every time. Further, an approximate quantitative value of the number of fluorescent dyes can also be output from a luminance value subjected to sensitivity calibration.

When a spectral radiance (W/(sr·m2·nm)) is adopted for the calibrated spectrum, the sensitivity of the imaging element 32 equivalent to wavelengths is also corrected. In this way, by calibrating a reference spectrum, it is unnecessary to measure a reference spectrum used for color separation calculation for each equipment. If a dye is stable in the same lot, the dye can be diverted if used for imagine once. Further, if fluorescence spectrum intensity per molecule of a dye is given in advance, an approximate value of the number of fluorescent dye molecules converted from the luminance value subjected to the sensitivity calibration can be output. This value is high in quantitatively because autofluorescence components are also separated.

The above processing is similarly executed for an illumination range by the line illuminations Ex1 and Ex2 in the sample S scanned in the Y-axis direction. Consequently, spectral data (x, y, λ) of fluorescence spectra is obtained for the entire range of the sample S. The obtained spectral data (x, y, λ) is stored in the storage section 21.

In the next Step S104, the processing unit 2 causes the image forming section 23 to form the fluorescence image of the sample S based on the spectral data (x, y, λ) stored in the storage section 21 or the spectral data (x, y, λ) calibrated by the data calibration section 22 and the interval corresponding to the distance Δy between the axes of the line illuminations Ex1 and Ex2. For example, the image forming section 23 forms, as a fluorescence image, an image in which a detection coordinate of the imaging element 32 is corrected with a value equivalent to the distance Δy of the interval between the plurality of line illuminations Ex1 and Ex2.

Since three-dimensional data deriving from the line illuminations Ex1 and Ex2 is data in which coordinates are shifted by the distance Δy on the Y axis, the three-dimensional data is corrected based on the distance Δy recorded in advance or a value of the distance Δy calculated from the output of the imaging element 32 and is output. Here, the difference in the detection coordinate in the imaging element 32 is corrected such that the three-dimensional data deriving from the line illuminations Ex1 and Ex2 are data on the same coordinate.

In the next step S105, the processing unit 2 causes the image forming section 23 to execute processing (stitching) for connecting captured images to form one large image (WSI: Whole Slide Imaging). Consequently, it is possible to acquire a pathological image concerning the multiplexed sample S (the observation target Sa). In the next step S106, a formed fluorescence image is output to the display section 3.

In the next step S107, the processing unit 2 causes the image forming section 23 to separate and calculates component distributions of the autofluorescence and the dye of the sample S from the captured spectral data (measurement spectrum) based on standard spectra of the autofluorescence and the dye alone of the sample S stored in advance in the storage section 21. As an arithmetic operation method for the separation calculation, a least squares method, a weighted least squares method, and the like can be adopted and a coefficient is calculated such that imaged spectral data is a linear sum of the standard spectra. In the next step S108, the calculated distribution of the coefficients is stored in the storage section 21 and output to the display section 3 and displayed as an image.

(2-3. Wavelength Coupling)

As explained above, in the observation unit 1 applicable to the embodiment, by irradiating one sample S with a plurality of excitation lights respectively having different wavelengths, a plurality of fluorescence spectra respectively having different wavelength regions are acquired. It is not efficient to independently treat each of the plurality of fluorescence spectra acquired from the one sample S. Therefore, the plurality of fluorescence spectra acquired from the one sample S are coupled in a wavelength direction to be able to be treated as a group of data.

FIGS. 12A, 12B, 12C, and 12D are schematic diagrams illustrating a specific example of the fluorescence spectrum acquired by the spectral imaging section 30. For example, the spectral imaging section 30 acquires a fluorescence spectrum for each of lines on which the sample S is scanned in the Y-axis direction. In sections A, B, C, and D in FIG. 2, the sample S contains four types of fluorescent substances called DAPI, CK/AF488, PgR/AF594, and ER/AF647. Specific examples of fluorescence spectra acquired when the fluorescent substances are irradiated with excitation light having respective excitation wavelengths of 392 (nm) (the section A in FIG. 2), 470 (nm) (the section B in FIG. 2), 549 (nm) (the section C in FIG. 2), 628 (nm) (the section D in FIG. 2) are illustrated.

It should be noted that the fluorescence wavelength is shifted to a longer wavelength side than the excitation wavelength because energy is emitted for fluorescence emission (stokes shift). The fluorescent substance contained in the sample S and the excitation wavelength of the excitation light to be irradiated are not limited to the examples explained above. The spectral imaging section 30 passes the acquired fluorescence spectra to the processing unit 2. The processing unit 2 stores the fluorescence spectra passed from the spectral imaging section 30 in the storage section 21.

For example, the processing unit 2 causes the image forming section 23 to couple, in the wavelength direction, at least a part of the plurality of fluorescence spectra acquired by the spectral imaging section 30 and stored in the storage section 21 and generate a connected fluorescence spectrum.

FIGS. 13A, 13B, 13C, 13D, and 13E are schematic diagrams for explaining coupling of fluorescence spectra by the image forming section 23. In FIGS. 13A, 13B, 13C, 13D, and 13E, FIGS. 13A, 13B, 13C, and 13D respectively correspond to FIGS. 12A, 12B, 12C, and 12D explained above.

For example, the image forming section 23 extracts data having a predetermined width in the fluorescence spectra to include a maximum value of fluorescence intensity in each of the four fluorescence spectra acquired by the spectral imaging section 30 illustrated in FIGS. 13A, 13B, 13C, and 13D. The width of a wavelength band in which the image forming section 23 extracts data can be determined based on reagent information, an excitation wavelength, a fluorescence wavelength, or the like and may be different for each of fluorescent substances. In other words, the width of the wavelength band in which the image forming section 23 extracts data may be different in each of the fluorescence spectra illustrated in FIGS. 13A, 13B, 13C, and 13D.

As illustrated in FIG. 13E, the image forming section 23 generates one coupled fluorescence spectrum by coupling the extracted data in the wavelength direction. At this time, the image forming section 23 couples, for example, for each of positions on a line on which the sample S is scanned in the Y-axis direction on the line by the spectral imaging section 30, the plurality of fluorescence spectra acquired for each of the positions on the line. For example, when four fluorescence spectra are acquired in a position x on a certain line, the image forming section 23 couples the four fluorescence spectra to generate a coupled fluorescence spectrum in the position x of the line.

It should be noted that, since the coupled fluorescence spectrum is configured by the data extracted from the plurality of fluorescence spectra, wavelengths are not continuous in boundaries of the coupled data.

The image forming section 23 performs the coupling explained after aligning the intensities of the excitation lights respectively corresponding to the plurality of fluorescence spectra based on the intensities of the excitation lights (in other words, after correcting the plurality of fluorescence spectra). More specifically, the image forming section 23 performs the coupling explained above after aligning the intensities of the excitation lights respectively corresponding to the plurality of fluorescence spectra by dividing the fluorescence spectra by excitation power density that is the intensity of excitation light. Consequently, a fluorescence spectrum in the case in which excitation light having the same intensity is irradiated is obtained. When the intensity of the excitation light to be emitted is different, the intensity of a spectrum absorbed by the sample S (hereinafter referred to as an "absorption spectrum") is also different according to the intensity. Therefore, since the intensities of the excitation lights respectively corresponding to the plurality of fluorescence spectra are aligned as explained above, the absorption spectrum can be appropriately evaluated.

(2-4. Hardware Configuration Example)

Figure 14:
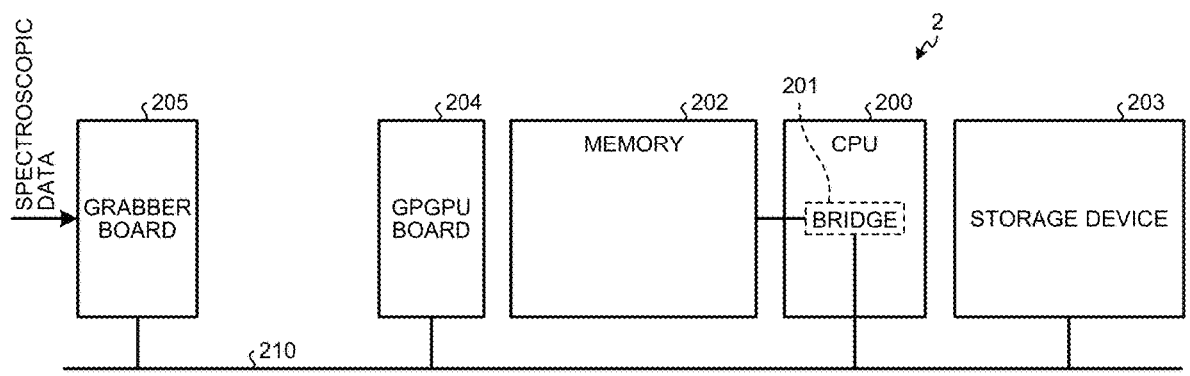
FIG. 14 is a block diagram illustrating an example of a hardware configuration of a processing unit applicable to the embodiment.

Next, a hardware configuration example of the processing unit 2 applicable to the embodiment is explained. FIG. 14 is a block diagram illustrating an example of a hardware configuration of the processing unit 2 applicable to the embodiment. In FIG. 14, the processing unit 2 includes a CPU 200, a bridge 201, a memory 202, a storage device 203, a GPGPU (General-Purpose computing on Graphics Processing Units) board 204, and a grabber board 205. These units are communicably connected to one another by a bus 210. In this way, a configuration of a computer functioning as a general information processing apparatus can be applied to the processing unit 2.

The storage device 203 is a nonvolatile storage medium such as a hard disk drive or a flash memory and corresponds to, for example, at least a part of the storage section 21 illustrated in FIG. 2. The storage device 203 stores in advance a program for operating the CPU 200, the spectral data (x, λ) acquired by the spectral imaging section 30, information indicating a standard spectrum of autofluorescence concerning a sample to be observed, and information indicating a standard spectrum of a single dye that stains sample.

The memory 202 is, for example, a RAM (Random Access Memory). The memory 202 may be further included as a part of the storage section 21. The memory 202 may further have a function of a ROM (Read Only Memory). The memory 202 can store a program for the CPU 200 to operate.

The CPU 200 is connected to the memory 202 via the bridge 201. The CPU 200 controls an overall operation of the processing unit 2 using the memory 202 as a work memory according to, for example, a program stored in the storage device 203. For example, a program according to the embodiment is executed, whereby the CPU 200 configures, respectively as, for example, modules, the storage section 21 (the storage control section), the data calibration section 22, and the image forming section 23 in the processing unit 2 explained with reference to FIG. 2 on a main storage region in the memory 202.

The grabber board 205 acquires, as image data, the spectral data (x, λ) passed from the spectral imaging section 30 and/or read from the storage section 21. According to the control of the CPU 200, the GPGPU board 204 undertakes a part or all of processing for the spectral data (x, λ) by the CPU 200.

3. Embodiment of the Present Disclosure (3-1. Overview of the Embodiment)

Subsequently, an embodiment of the present disclosure is explained. In the embodiment, the sample S irradiated with a plurality of excitation lights having different wavelengths is scanned in the Y-axis direction. The spectral data (x, λ) for each of lines by the respective plurality of fluorescence wavelengths acquired in the arrangement order of lines by the scanning is converted into arrangement order of each of the plurality of fluorescence wavelengths. More specifically, the acquired spectral data (x, λ) for each of the lines by the respective plurality of fluorescence wavelengths is collected in a plurality of lines, on which the scanning is performed, and, for each of the fluorescence wavelengths, converted into image data by two-dimensional information for the sample S represented by the coordinates (x, y). As described above, by converting the spectral data (x, λ) by the position information in the line direction and the wavelength λ into the image data by the two-dimensional information corresponding to the surface of the sample S, image processing and the like in a later stage can be more easily and quickly performed.

Figure 15A:
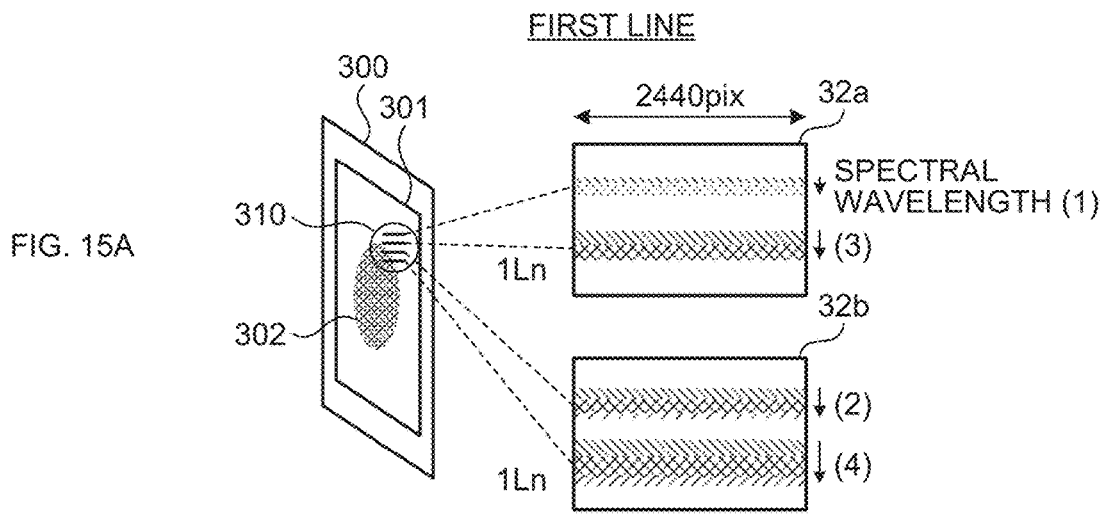
FIGS. 15A, 15B, and 15C are diagrams schematically illustrating a flow of spectral data acquisition processing according to the embodiment.
Figure 15B:
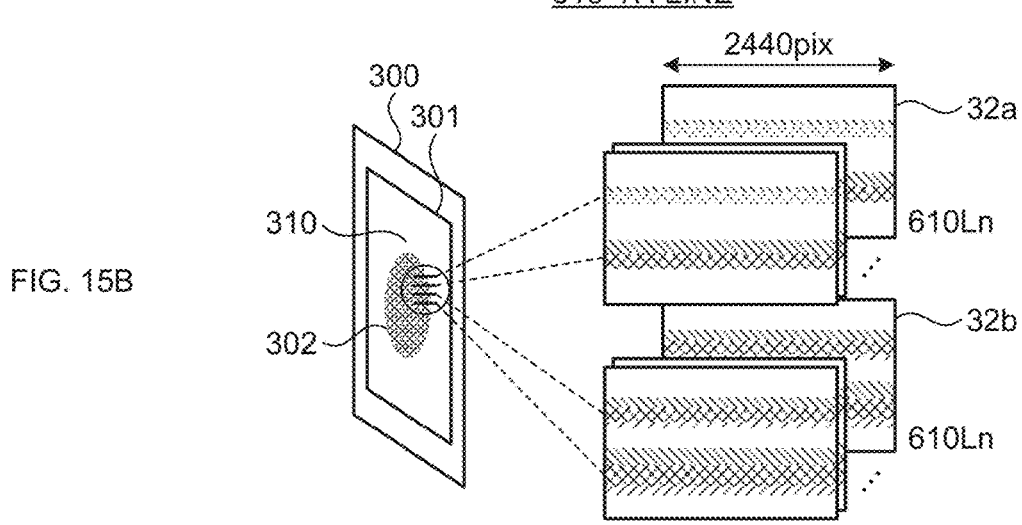
Figure 15C:
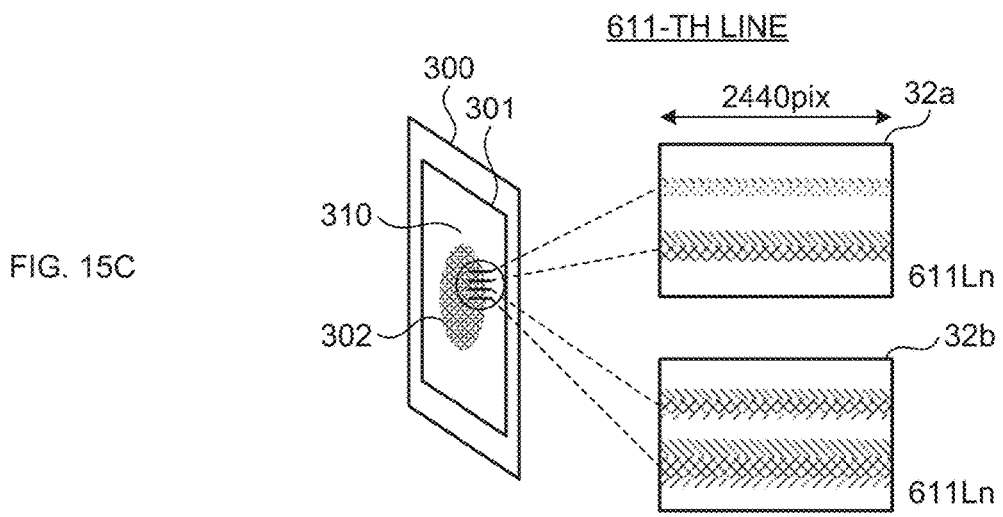

FIGS. 15A, 15B, and 15C are diagrams schematically illustrating a flow of acquisition processing for the spectral data (x, λ) according to the embodiment. In the following explanation, the configuration example 2 illustrated in FIG. 10 is applied as a configuration example of a combination of line illumination and excitation light using the two imaging elements 32a and 32b. It is assumed that the imaging element 32a acquires spectral data (x, λ) corresponding to excitation wavelengths λ=405 (nm) and 532 (nm) by the line illumination Ex1, and the imaging element 32b acquires spectral data (x, λ) corresponding to excitation wavelengths λ=488 (nm) and 638 (nm) by the line illumination Ex2. The number of pixels corresponding to one line of scan is set to 2440 (pix) and a scan position is moved in the X-axis direction for each scan of 610 lines in the Y-axis direction.

FIG. 15A illustrates an example of spectral data (x, λ) acquired in a first line of the scan (also described as "1 Ln" in the figure). A tissue 302 corresponding to the sample S explained above is fixed by being sandwiched between the slide glass 300 and the cover glass 301 and is placed on the sample stage 20 with the slide glass 300 set as a lower surface. A region 310 in the figure indicates an area irradiated with four laser lights (excitation lights) by the line illuminations Ex1 and Ex2.

In the imaging elements 32a and 32b, the horizontal direction (the row direction) in the figure indicates a position in a scan line and the vertical direction (the column direction) indicates a wavelength.

In the imaging element 32a, a plurality of fluorescence images (spectroscopic data (x, λ)) corresponding to the spectral wavelengths (1) and (3) respectively corresponding to the excitation wavelengths λ=405 (nm) and 532 (nm) are acquired. For example, in an example of the spectral wavelength (1), the spectral data (x, λ) acquired here includes data (a luminance value) in a predetermined wavelength region (referred to as spectral wavelength region as appropriate) including a maximum value of fluorescence corresponding to the excitation wavelength λ=405 (nm).

Each of the spectral data (x, λ) is associated with a position in the column direction of the imaging element 32a. At this time, the wavelength λ may not be continuous in the column direction of the imaging element 32a. That is, the wavelength of the spectral data (x, λ) by the spectral wavelength (1) and the wavelength of the spectral data (x, λ) by the spectral wavelength (3) may not be continuous including a blank portion therebetween.

Similarly, in the imaging element 32b, spectral data (x, λ) by spectral wavelengths (2) and (4) respectively by excitation wavelengths λ=488 (nm) and 638 (nm) are acquired. Here, the spectral data (x, λ) include data (luminance values) in a predetermined wavelength region including a maximum value of fluorescence corresponding to the excitation wavelength λ=405 (nm), for example, in the example of the spectral wavelength (1).

Here, as explained with reference to FIG. 6 and FIG. 8, in the imaging elements 32a and 32b, data in the wavelength region of the spectral data (x, λ) are selectively read and data in other regions (indicated as blank portions in the figure) are not read. For example, in the example of the imaging element 32a, the spectral data (x, λ) in the wavelength region of the spectral wavelength (1) and the spectral data (x, λ) in the wavelength region of the spectral wavelength (3) are respectively acquired. The acquired spectral data (x, λ) of the wavelength regions are stored in the storage section 21 as the spectral data (x, λ) of the first line.

FIG. 15B illustrates an example of a case in which scan up to a 610-th line (also described as "610 Ln" in the figure) ends at the same scan position as FIG. 15A in the X-axis direction. At this time, the spectral data (x, λ) of the wavelength regions of the spectral wavelengths (1) to (4) for 610 lines are stored in the storage section 21 for each of the lines. When the reading of the spectral data (x, λ) for 610 lines and the storage in the storage section 21 end, scan of a 611-th line (also described as "611 Ln" in the figure) is performed as illustrated in FIG. 15C. In this example, the scan of the 611-th line is executed by moving a position in the X-axis direction of the scan and, for example, resetting the position in the Y-axis direction.

(3-2. Acquired Data Example and Rearrangement of Data)

Figure 16:
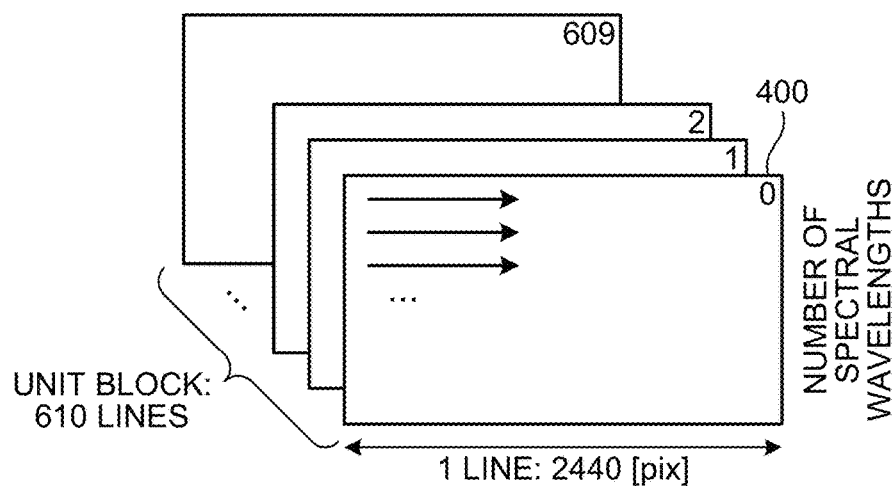
FIG. 16 is a schematic diagram illustrating an example of spectral data stored in a storage section at a point in time when scanning of the 610-th line ends.

Subsequently, acquired data and rearrangement of data according to the embodiment are explained. FIG. 16 is a schematic diagram illustrating an example of spectral data (x, λ) stored in the storage section 21 at a point in time when (scan of) the 610-th line illustrated in FIG. 15B ends. As illustrated in FIG. 16, the spectral data (x, λ) indicates a position on a line in the horizontal direction in the figure for each of scan lines and a block indicating the number of spectral wavelengths in the vertical direction in the figure is stored in the storage section 21 as a frame 400. Then, a unit block is formed by frames 400 for 610 lines.

Note that, in FIG. 16 and the following similar figures, an arrow in the frame 400 indicates a direction of memory access in the storage section 21 in the case in which a C language, which is one of programming languages, or a language based on the C language is used for access to the storage section 21. In the example illustrated in FIG. 16, access is made in the horizontal direction (that is, the line position direction) of the frame 400 and this is repeated in the vertical direction of the frame 400 (that is, the direction of the number of spectral wavelengths).

Note that the number of spectral wavelengths corresponds to the number of channels in the case in which a spectral wavelength region is divided into a plurality of channels.

In the existing technique, the spectral data (x, λ) is read in the data arrangement order illustrated in FIG. 16. In this case, in the data arrangement order illustrated in FIG. 16, an array of pixels in the frame 400 does not correspond to two-dimensional information in the tissue 302 on the slide glass 300. Therefore, it is not easy to treat the spectral data (x, λ) of the tissue 302 as two-dimensional information for the tissue 302.

Note that, in FIG. 16, the frame 400 corresponding to scan of a first line is illustrated as a zeroth frame and the frame 400 corresponding to scan of a 610-th line is illustrated as a 609-th frame.

In the embodiment, the processing unit 2 converts, for example, with the image forming section 23, the arrangement order of the spectral data (x, λ) of the wavelength regions stored for each of the lines into the arrangement order for each of the spectral wavelengths (1) to (4).

Figure 17:
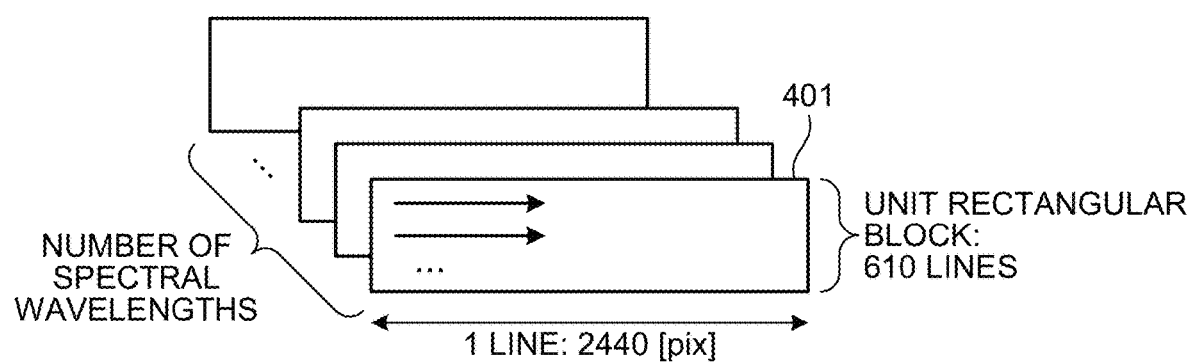
FIG. 17 is a schematic diagram illustrating an example of spectral data in which arrangement order of data is changed according to the embodiment.

FIG. 17 is a schematic diagram illustrating an example of spectral data (x, λ) in which data arrangement order is changed according to an embodiment. As illustrated in FIG. 17, data arrangement order of the spectral data (x, λ) is converted, for each of spectral wavelengths, from the arrangement order illustrated in FIG. 16 into the arrangement order indicating the position on the line in the horizontal direction in the drawing and indicating the scan line in the vertical direction in the drawing for each spectral wavelength, and is stored in the storage section 21. Here, a frame 401 including 2440 (pix) in the horizontal direction and 610 lines in the vertical direction in the figure is referred to as unit rectangular block.

In the data arrangement order by the unit rectangular block according to the embodiment illustrated in FIG. 17, an array of pixels in the frame 401 corresponds to two-dimensional information in the tissue 302 on the slide glass 300. Therefore, in the unit rectangular block (the frame 401) according to the embodiment, compared with the frame 400 illustrated in FIG. 16, the spectral data (x, λ) of the tissue 302 can be directly treated as the two-dimensional information for the tissue 302. Therefore, by applying the processing unit 2 according to the embodiment, it is possible to more easily and quickly perform image processing, spectral waveform separation processing (color separation processing), and the like for captured image data acquired by the line spectrometer (the observation unit 1).

(3-3. Wavelength Coupling)

Next, wavelength coupling processing according to the embodiment is explained.

(3-3-1. Wavelength Coupling According to the Existing Technique)

First, wavelength coupling processing according to the existing technique is explained with reference to FIG. 18. In the left figure of FIG. 18, the directions of the unit blocks explained with reference to FIG. 16 are transposed and illustrated. As explained above, the wavelength coupling is performed, for example, by coupling spectral data (x, λ) at a certain position x in a certain scan line by the spectral wavelengths (1) to (4) in the wavelength direction. Therefore, as illustrated in the left figure of FIG. 18, the spectral data (x, λ) are read by accessing a unit block stored in the storage section 21 in the horizontal direction on the figure as indicated by an arrow in the figure.

Figure 18:
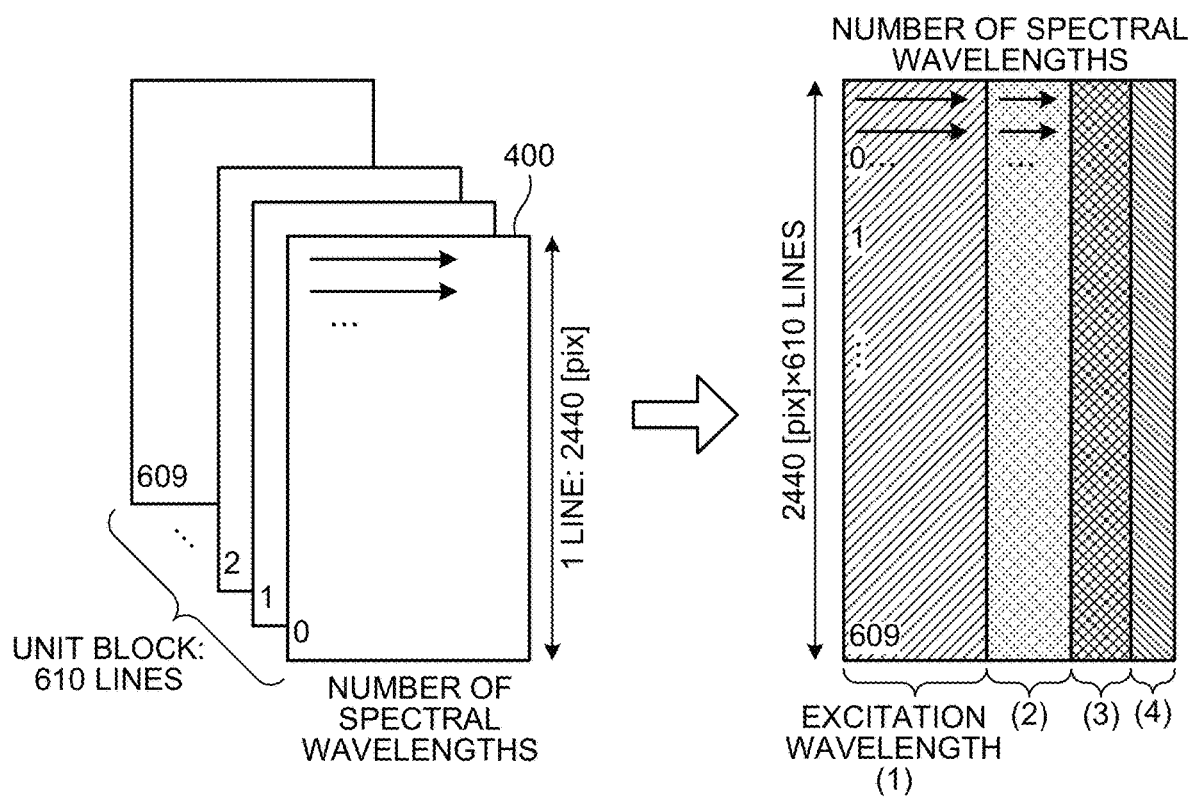
FIG. 18 is a schematic diagram for explaining wavelength coupling processing according to an existing technique.

The right figure of FIG. 18 schematically illustrates a state in which the spectral data (x, λ) read out in this manner are coupled in the wavelength direction. As explained above, a fluorescence spectrum (coupled spectral data) in which the spectral data (x, λ) in the position x in the scan line are coupled in the wavelength direction is generated for each line of the 610 lines by the number of pixels (2440 (pix)) and stored in the storage section 21. More specifically, the spectral data (x, λ) of the spectral wavelengths (1) to (4) respectively corresponding to the excitation wavelengths (1) to (4) are arranged in the order of wavelength coupling in the horizontal direction in the figure and are arranged by the number of pixels×610 lines in the vertical direction.

At this time, in the storage section 21, reading of the spectral data (x, λ) is performed by memory access in the vertical direction in the figure as illustrated in the left figure of FIG. 18. This is access in a direction different from a normal memory access direction in the storage section 21. Therefore, reading processing becomes complicated and it is difficult to increase reading speed. If the spectral data (x, λ) for the number of spectral wavelengths is not obtained, data for one row cannot be stored in the storage section 21 and it is difficult to increase the processing speed from this point as well. As explained above, it is difficult to realize the wavelength coupling by the existing technique with simple memory coupling. The wavelength coupling by the existing technique is not considered efficient.

Figure 19A:
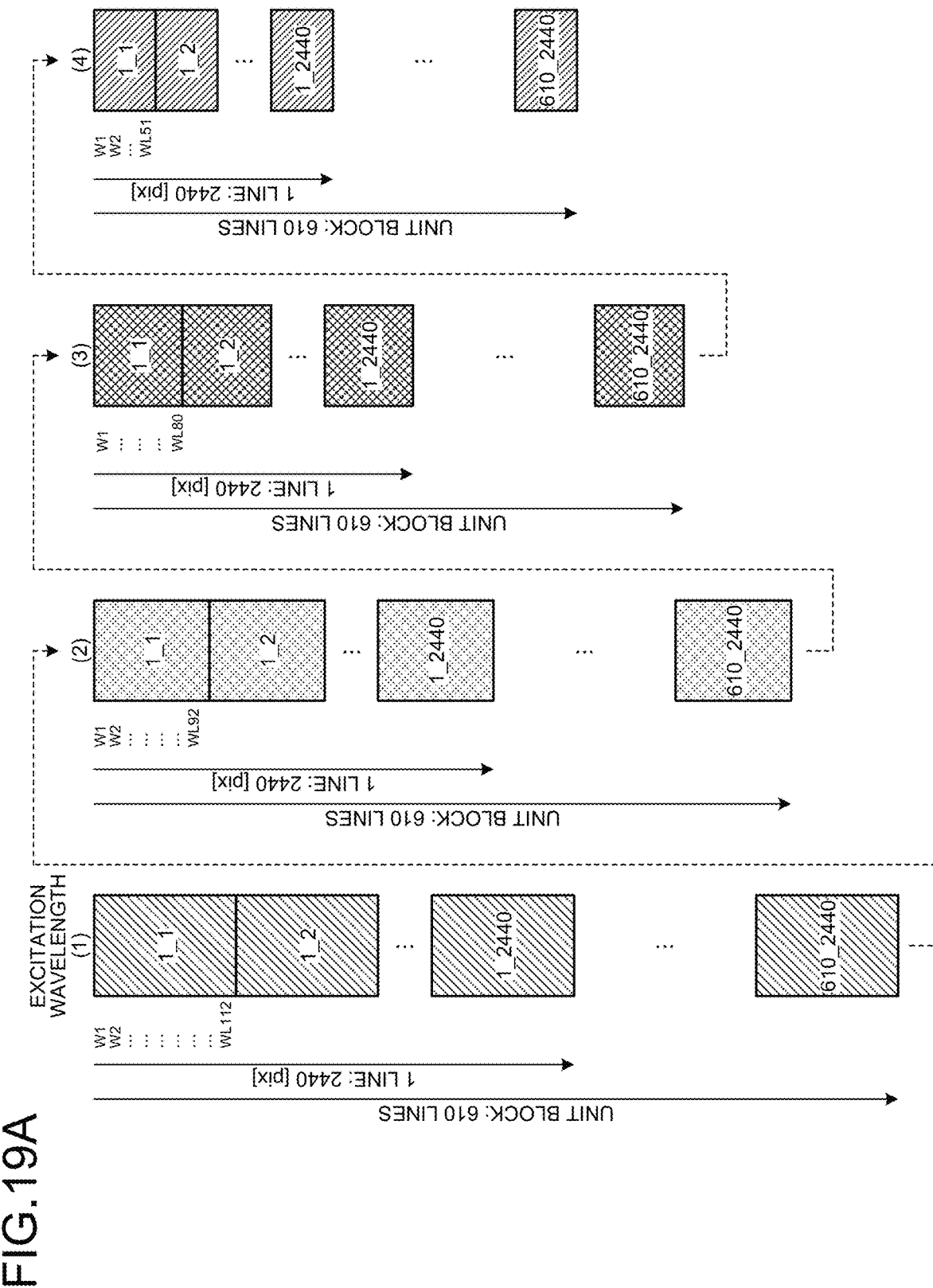
FIG. 19A is a schematic diagram more specifically illustrating a data array of an example of spectral data according to the existing technique.
Figure 19B:
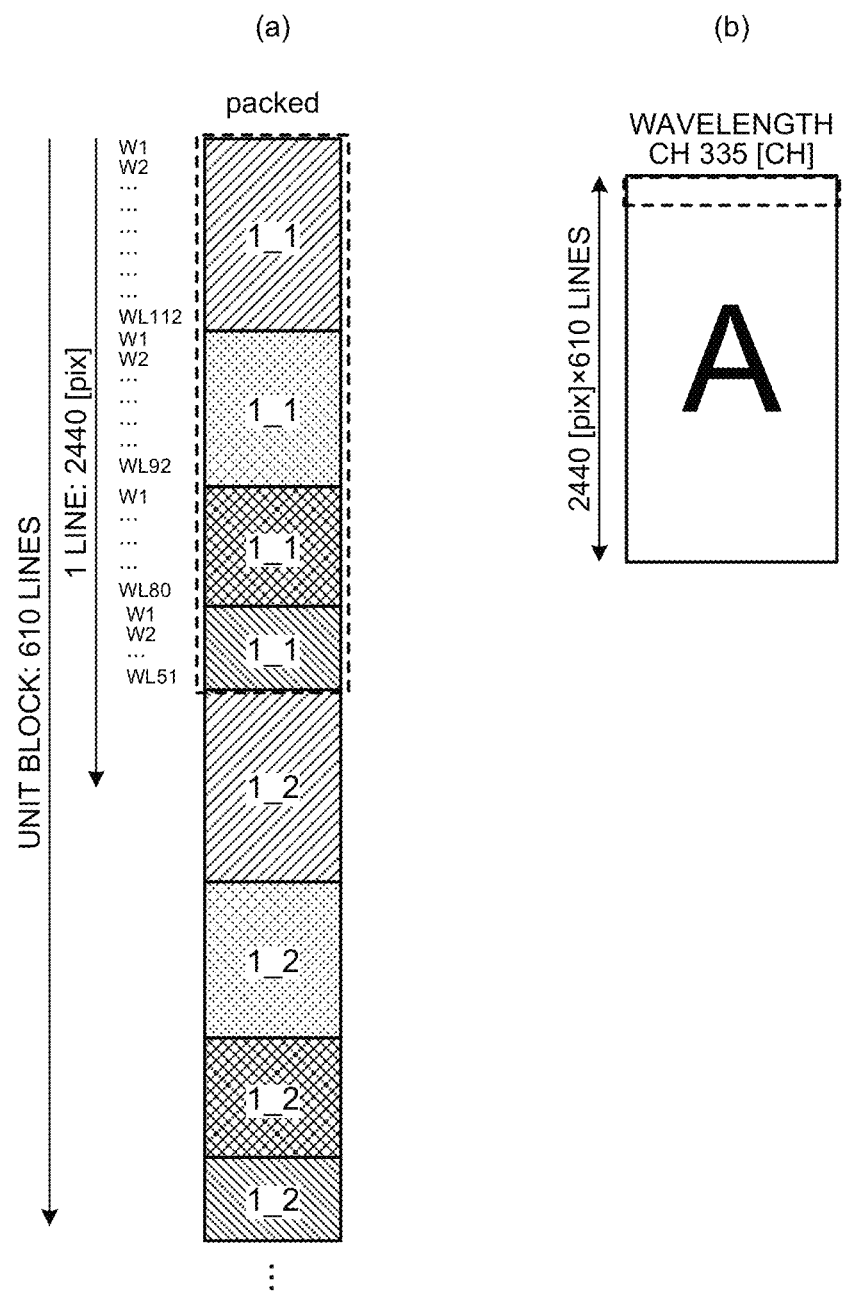
FIG. 19B is a schematic diagram more specifically illustrating the data array of the example of the spectral data according to the existing technique.

FIGS. 19A and 19B are schematic diagrams more specifically illustrating a data array of an example of the spectral data (x, λ) according to the existing technique. In FIG. 19A, it is assumed that excitation wavelengths (1) to (4) are respectively, for example, 405 (nm), 488 (nm), 532 (nm), and 638 (nm). Wavelength regions of the spectral wavelengths (1) to (4) respectively by the excitation wavelengths (1) to (4) are respectively divided into 112 CH (channel), 92 CH, 80 CH, and 51 CH. Luminance values of fluorescence are measured in the respective divided wavelength channels.

In an example illustrated in FIG. 19A, for example, in a first line of the excitation wavelength (1), measurement values of channels (WL1, WL2, . . . , and WL112) of the spectral wavelength (1) corresponding to the excitation wavelength (1) are arranged for blocks n-1, n-2, . . . , n-2440 (n=1) respectively corresponding to pixels (pix) of the first line. The blocks n-1, n-2, . . . , and n-2440 are repeated for the 610 lines to form a unit block corresponding to the excitation wavelength (1).

Similarly, for the excitation wavelength (2), measurement values of the channels (WL1, WL2, . . . , WL92) of the spectral wavelength (2) corresponding to the excitation wavelength (2) are arranged for the blocks n-1, n-2, . . . , and n-2440 respectively corresponding to pixels of an n-th line. The blocks n-1, n-2, . . . , and n-2440 are repeated for the 610 lines (n=1 to 610) to form a unit block corresponding to the excitation wavelength (2). The same applies to the excitation wavelengths (3) and (4).

The unit blocks corresponding to the excitation wavelengths (1) to (4) are sequentially connected as indicated by dotted lines in the figure and stored in the storage section 21. Note that, since the numbers of wavelength channels of the excitation wavelengths (1) to (4) are different, the sizes of the blocks n-1, n-2, . . . , and n-2440 are also different at the excitation wavelengths (1) to (4).

FIG. 19B is a schematic diagram illustrating an example in which wavelength coupling is performed based on the data array explained with reference to FIG. 19A. As explained above, the wavelength coupling is performed, for example, by coupling, in the wavelength direction, the spectral data (x, λ) by the spectral wavelengths (1) to (4) in a certain position x in a certain scan line. Therefore, in the existing technique in which the data rearrangement explained with reference to FIG. 16 is not performed, as surrounded by a dotted line in a section (a) of FIG. 19B and illustrated, the wavelength coupling is performed by arranging, in the order of wavelengths to be coupled, the blocks corresponding to the lines of the excitation wavelengths (1) to (4) and the pixel positions.

A section (b) of FIG. 19B schematically illustrates an image wavelength-coupled in this way. In this case, luminance values of 335 CH (=112 CH+92 CH+80 CH+51 CH) in one pixel on a line by scan are aligned in a row direction (the horizontal direction in the figure) of the image and an image in which the luminance values are repeated for 2440 (pix)×610 lines is formed.

In the wavelength coupling according to the existing technique, it is necessary to read the spectral data (x, λ) to the storage section 21 from the storage intermittently for each of unit blocks. In addition, sizes of blocks included in the unit blocks are also different. Therefore, memory access in the storage section 21 becomes complicated, which is not considered efficient.

(3-3-2. Wavelength Coupling According to the Embodiment)

Figure 20:
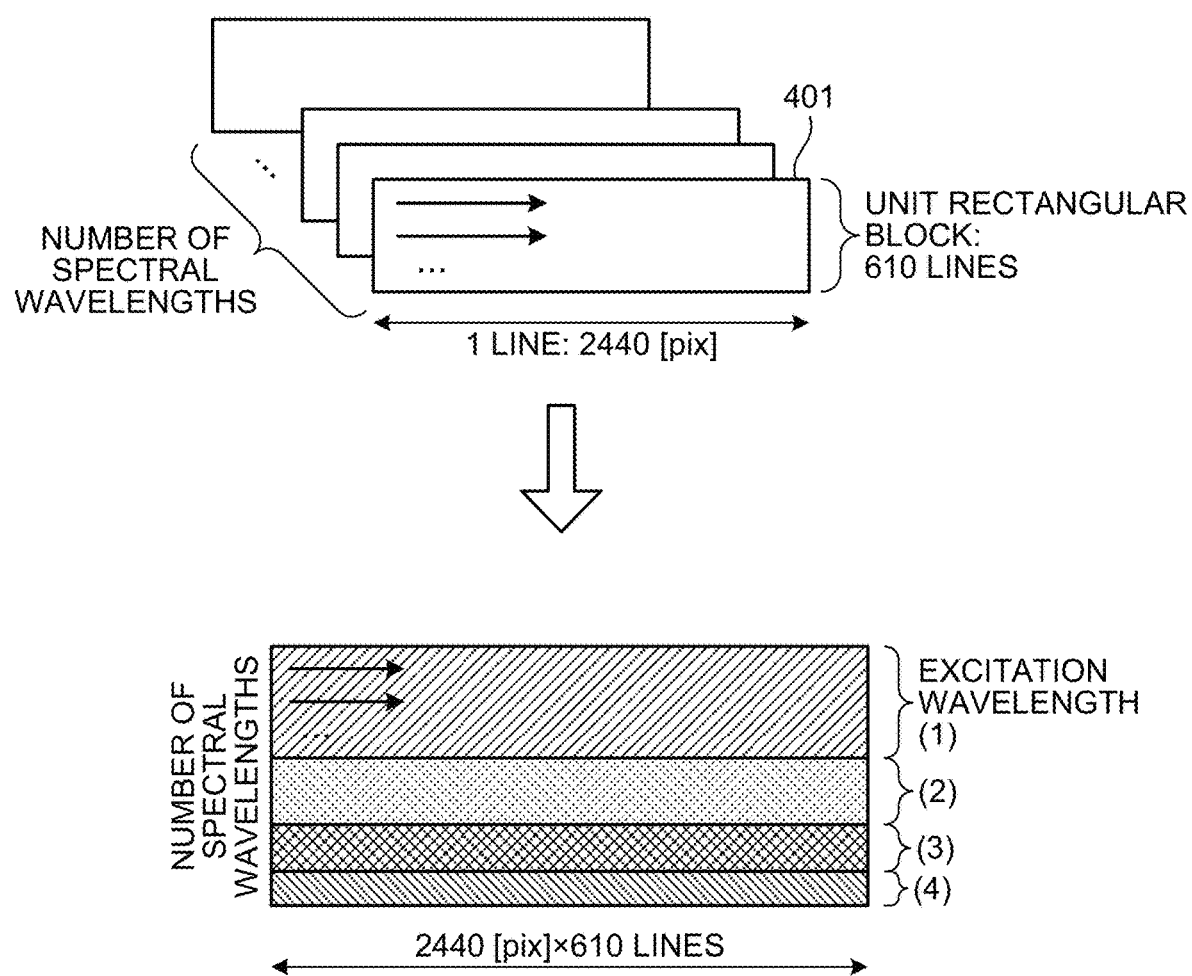
FIG. 20 is a schematic diagram for explaining wavelength coupling according to the embodiment.

Subsequently, the wavelength coupling according to the embodiment is explained with reference to FIG. 20. The left figure of FIG. 20 is the same figure as FIG. 17 referred to above. The right figure of FIG. 20 schematically illustrates a state in which spectral data (x, λ) read in a direction indicated by an arrow in the left figure of FIG. 20 are connected in the wavelength direction. In this case, as illustrated in the right figure of FIG. 20, unit rectangular blocks respectively corresponding to the excitation wavelengths (1) to (4) are coupled in the vertical direction in the figure in the order of the spectral wavelengths respectively corresponding to the excitation wavelengths (1) to (4). The wavelength coupling is performed by reading the coupled unit rectangular block in a coupling direction, that is, the vertical direction in the figure.

As explained above, according to the embodiment, by simply coupling the unit rectangular blocks in the wavelength direction, it is possible to obtain a data array for the wavelength coupling, which is efficient.

Figure 21A:
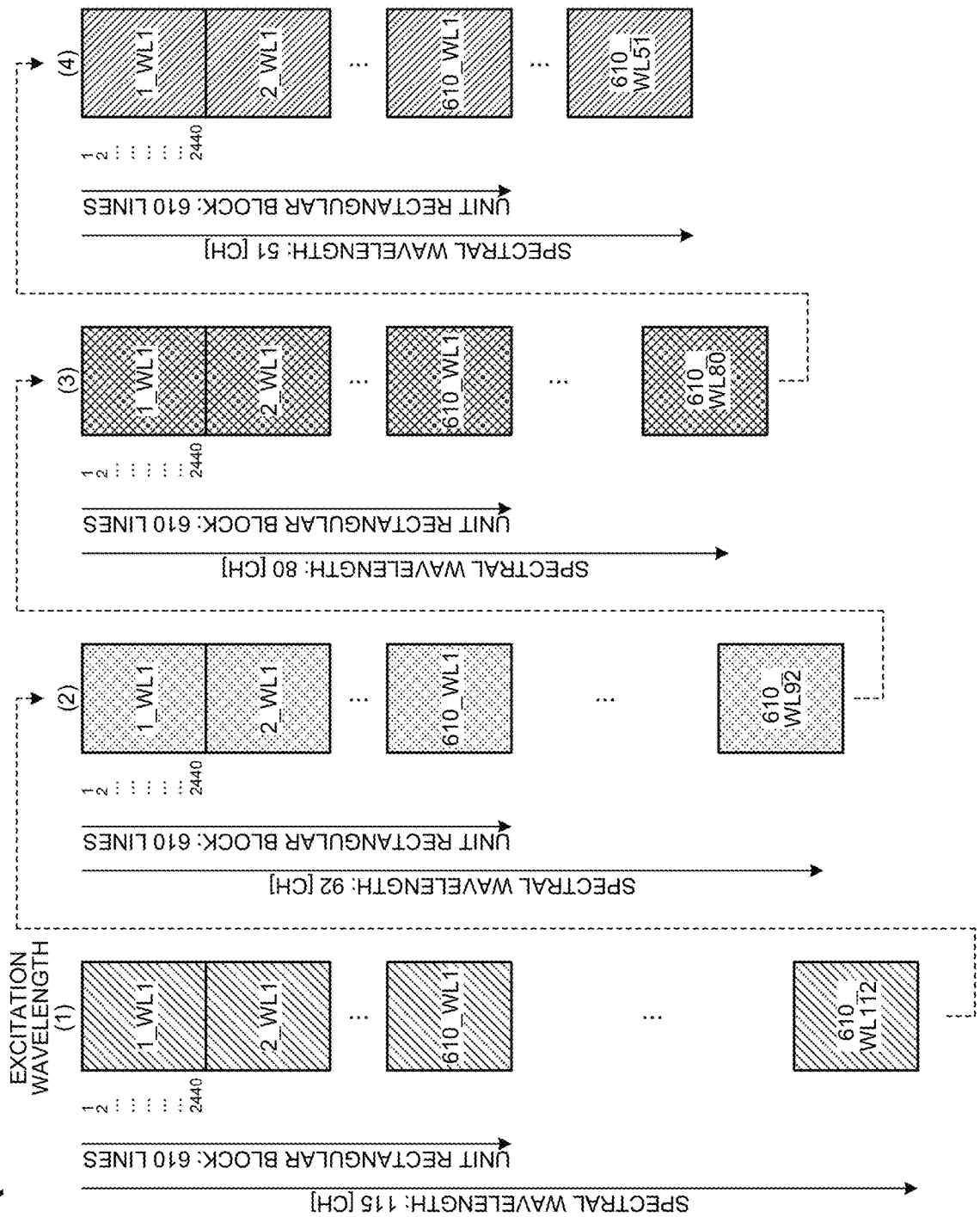
FIG. 21A is a schematic diagram more specifically illustrating a data array of an example of spectral data according to the embodiment.
Figure 21B:
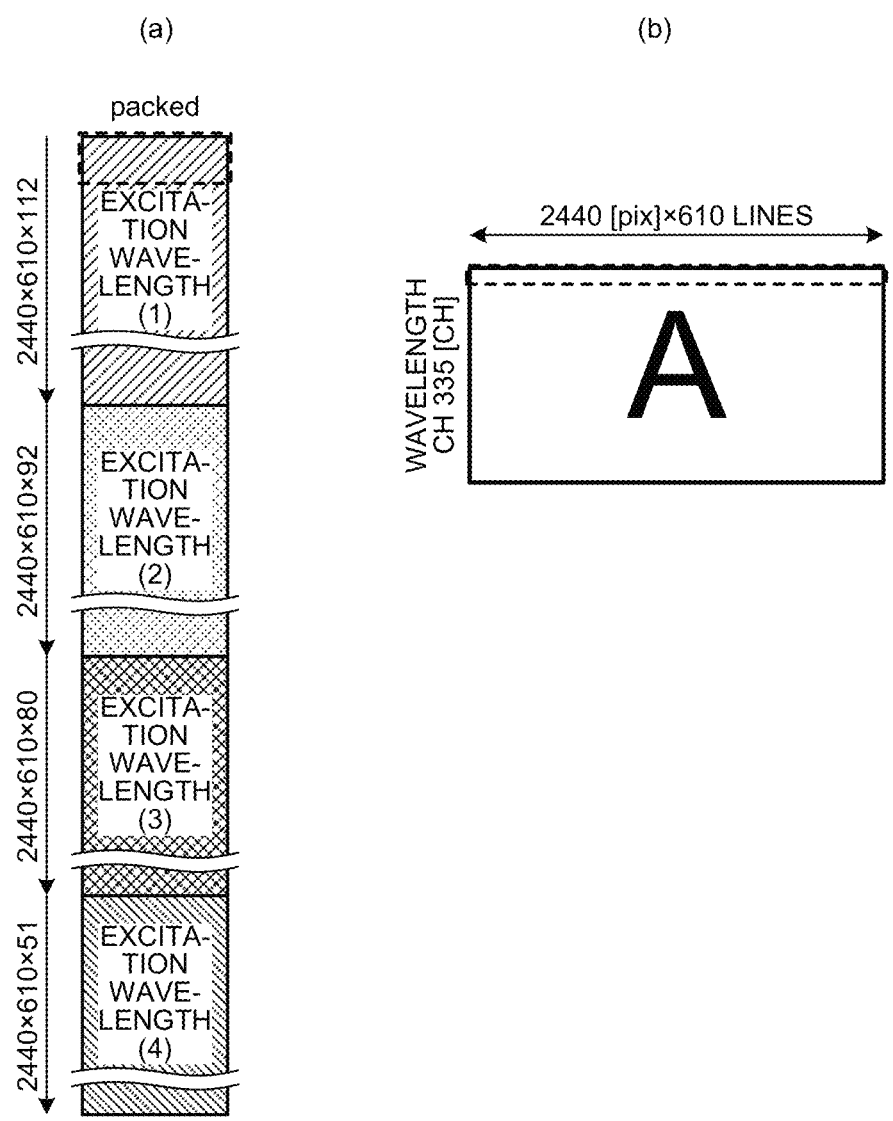
FIG. 21B is a schematic diagram more specifically illustrating the data arrangement of the example of the spectral data according to the embodiment.

FIGS. 21A and 21B are schematic diagrams more specifically illustrating a data array of an example of spectral data (x, λ) according to the embodiment. As in FIG. 19A, the excitation wavelengths (1) to (4) are respectively, for example, 405 (nm), 488 (nm), 532 (nm), and 638 (nm) and wavelength regions of the spectral wavelengths (1) to (4) by the respective excitation wavelengths (1) to (4) are respectively divided into 112 CH (channel), 92 CH, 80 CH, and 51 CH.

In an example illustrated in FIG. 21A, for example, at the excitation wavelength (1), with respect to a first channel (WL1) of the spectral wavelength (1) corresponding to the excitation wavelength (1), measurement values of positions (1, 2, . . . , and 2440) on lines of the spectral wavelength (1) corresponding to the excitation wavelength (1) are arranged with respect to blocks 1_WLm, 2_WLm, . . . , 610_WLm (m=1) for each of lines by scan. Blocks 1_WLm, 2_WLm, . . . , and 610_WLm are repeated for 610 lines (m 1 to 610) to form a unit rectangular block for a first channel of the excitation wavelength (1). Then, this unit rectangular block is repeated for the number of channels (=115 CH) of the spectral wavelength (1) at the excitation wavelength (1).

Similarly, for the excitation wavelength (2), the measurement values of the positions (1, 2, . . . , and 2440) on each of lines of the spectral wavelength (2) corresponding to the excitation wavelength (2) are arranged with respect to block 1_WLm, 2_WLm, . . . , 610_WLm (m=1) of each of lines respectively by scan with respect to a first channel (WL1) of the spectral wavelength (2) corresponding to the excitation wavelength (2). The blocks 1_WLm, 2_WLm, . . . , and 610_WLm are repeated for 610 lines (m=1 to 610) to form a unit rectangular block for a first channel of the excitation wavelength (2). Then, this unit rectangular block is repeated for the number of channels (=92 CH) of the spectral wavelength (2) at the excitation wavelength (2). The same applies to the excitation wavelengths (3) and (4).

Blocks in which the unit rectangular blocks corresponding to the excitation wavelengths (1) to (4) are repeated for the number of channels of the spectral wavelength are sequentially connected as indicated by dotted lines in the figure and stored in the storage section 21. Since the numbers of wavelength channels of the excitation wavelengths (1) to (4) are different, the sizes of the blocks in which the unit rectangular blocks are repeated for the number of channels of the spectral wavelength are different in the excitation wavelengths (1) to (4). On the other hand, since the unit rectangular blocks are configured by spectral data (x, λ) of the same channel CH for each of the lines, the sizes are the same in the excitation wavelengths (1) to (4).

FIG. 21B is a schematic diagram illustrating an example in which the wavelength coupling is performed based on the data array explained with reference to FIG. 19A. In the embodiment, the blocks in which the spectral data (x, λ) are arranged according to the positions on the lines are arranged in order of the lines for the same channel CH to form the unit rectangular block and the unit rectangular blocks are arranged in order of the channels CH to form the data of the excitation wavelengths (1) to (4). Therefore, as schematically illustrated in a section (a) of FIG. 21B, the wavelength coupling is performed by reading, from blocks on a target line included in the unit rectangular blocks corresponding to the channels CH in data of the respective excitation wavelengths (1) to (4), spectral data (x, λ) of target positions on the line.

A section (b) of FIG. 21B schematically illustrates such a wavelength-coupled image. In this case, pixels (2440 (pix)) of a line by scan are aligned for the number of lines (610 lines) in the row direction (the horizontal direction in the figure) of the image and an image in which this row is repeated for the number of channels CH (the wavelength channel CH=335 CH) by all the excitation wavelengths (1) to (4) is formed.

In the embodiment, the blocks of the target line included in the unit rectangular blocks corresponding to the channels CH have a common size. Therefore, the memory access to the storage section 21 is easy, which is efficient compared with the example of the existing technique explained above.

(3-3-3. Flow of Processing According to the Embodiment)

Figure 22A:
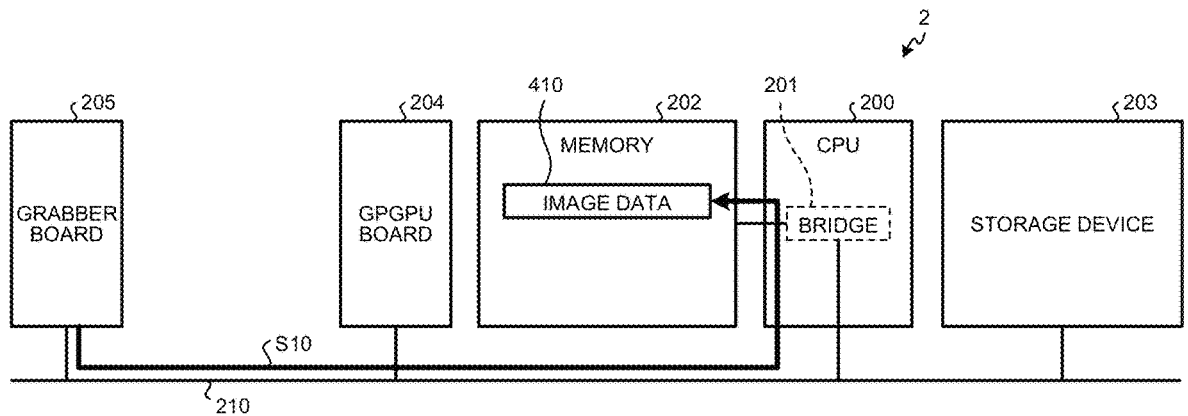
FIG. 22A is a schematic diagram for explaining a flow of processing according to the embodiment.

Subsequently, a flow of processing according to the embodiment is explained. FIGS. 22A, 22B, 22C, 22D, 22E, and 22F are schematic diagrams for explaining the flow of the processing according to the embodiment. First, as illustrated in FIG. 22A, spectral data (x, λ) for one line by scan acquired by the spectral imaging section 30 is taken into the grabber board 205 in the processing unit 2 and transferred from the grabber board 205 to the CPU 200 via the bus 210 (step S10, corresponding to, for example, step S101 in FIG. 11). The spectral data (x, λ) is transferred to the memory 202 via the bridge 201 in the CPU 200 and stored in the memory as image data 410. The image data 410 corresponds to the frame 400 indicating a position on the line in the horizontal direction and indicating the number of spectral wavelengths in the vertical direction explained with reference to FIG. 16.

Figure 22B:
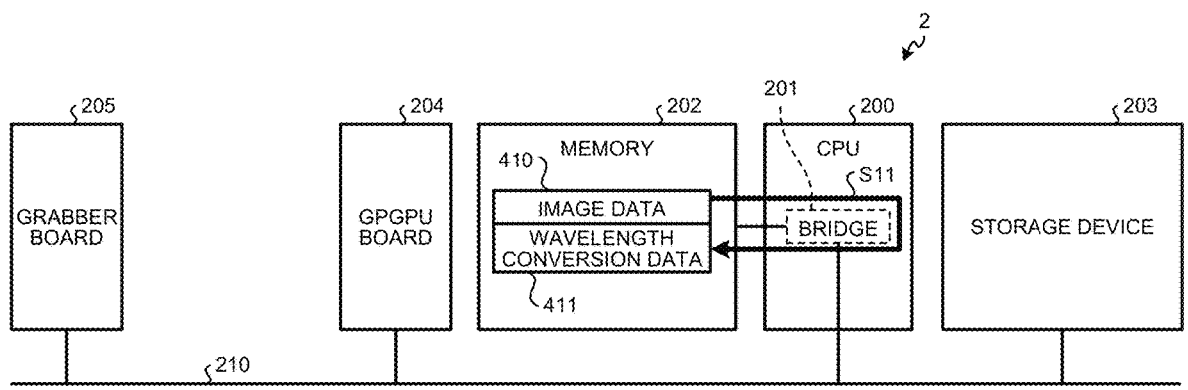
FIG. 22B is a schematic diagram for explaining the flow of the processing according to the embodiment.

Subsequently, as illustrated in FIG. 22B, the CPU 200 reads the image data 410 stored in the memory 202 via the bridge 201 and executes wavelength conversion processing (Step S11, corresponding to, for example, step S102 in FIG. 11). For example, the CPU 200 converts, according to the position y of data in the column direction in the position x in the row direction of the image data 410, the data into data of a wavelength and a luminance value at the wavelength. The CPU 200 transfers the data converted into the wavelength and the luminance value to the memory 202 via the bridge 201. The data transferred to the memory 202 is stored in the memory 202 as wavelength conversion data 411. The processing in step S11 is executed for each of scan lines.

Figure 22C:
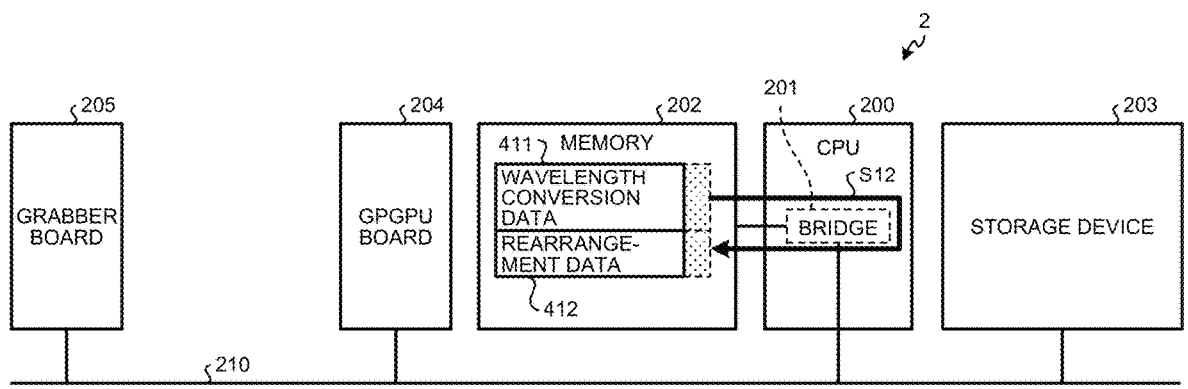
FIG. 22C is a schematic diagram for explaining the flow of the processing according to the embodiment.

When the process in step S11 is repeated for 610 lines by scan, the CPU 200 reads the wavelength conversion data 411 from the memory 202 via the bridge 201 as illustrated in FIG. 22C and rearranges the data as explained with reference to FIG. 17 (step S12). This rearrangement processing is executed for each of unit rectangular blocks in image order (pixel order) in the unit rectangular blocks. The data rearrangement processing by the CPU 200 is executed by, for example, the function of the storage section 21 illustrated in FIG. 2.

The CPU 200 transfers the rearrangement data to the memory 202 via the bridge 201. The data transferred to the memory 202 is stored in the memory 202 as rearrangement data 412. The rearrangement data 412 includes, for the number of spectral wavelengths, the unit rectangular blocks indicating the position on the line in the horizontal direction and indicating the line in the vertical direction explained with reference to FIG. 17.

Figure 22D:
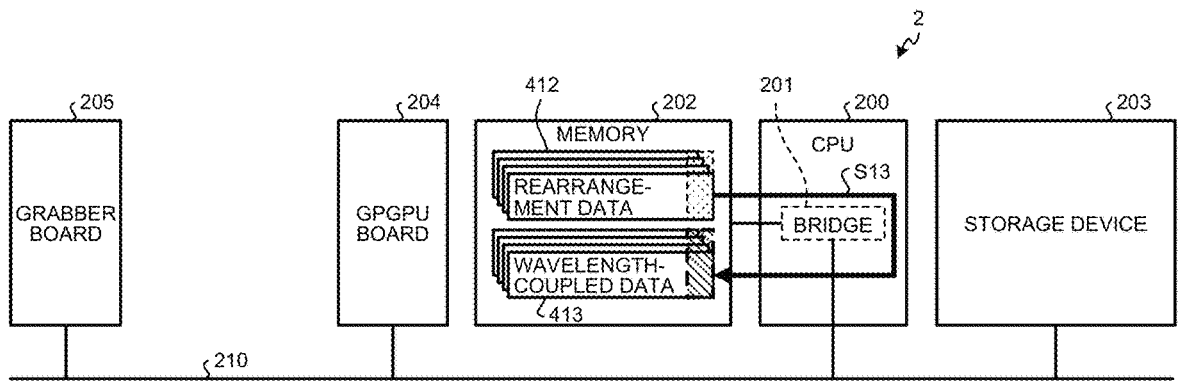
FIG. 22D is a schematic diagram for explaining the flow of the processing according to the embodiment.

When the processing in step S12 ends for all the unit rectangular blocks, as illustrated in FIG. 22D, the CPU 200 reads the rearrangement data 412 from the memory 202 via the bridge 201 and performs the wavelength coupling processing explained above in units of unit rectangular blocks (step S13, corresponding to, for example, step S105 in FIG. 11). The CPU 200 transfers wavelength-coupled data 413 subjected to the wavelength coupling to the memory 202 via the bridge 201. The wavelength-coupled data 413 is stored in the memory 202.

Figure 22E:
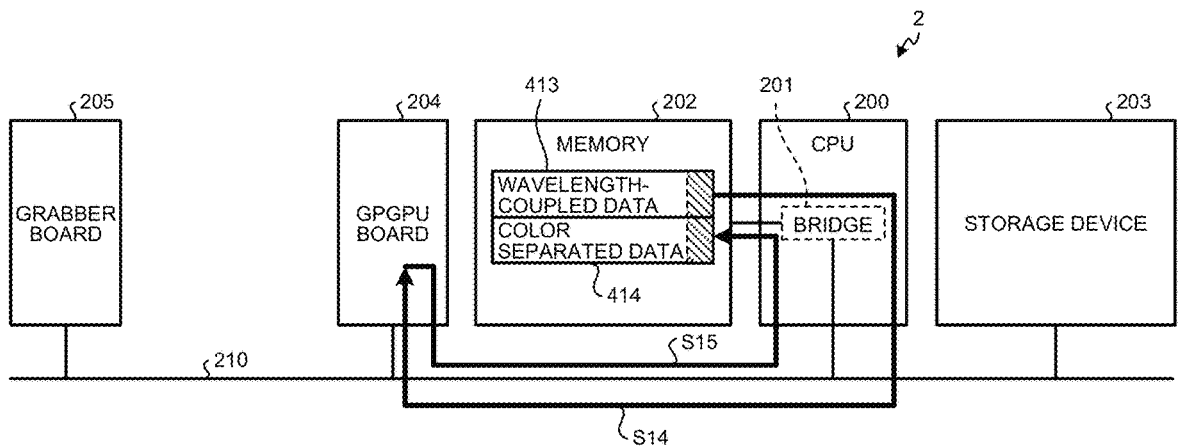
FIG. 22E is a schematic diagram for explaining the flow of the processing according to the embodiment.

Subsequently, as illustrated in FIG. 22E, the CPU 200 reads the wavelength-coupled data 413 from the memory 202 in units of unit rectangular blocks via the bridge 201. The CPU 200 transfers the wavelength-coupled data 413 read from the memory 202 to the GPGPU board 204 via the bridge 201 and the bus 210 (step S14). The GPGPU board 204 executes color separation processing for the transferred wavelength-coupled data 413 in units of unit rectangular blocks (corresponding to step S107 in FIG. 11).

The color separation processing includes, for example, processing for separating, from fluorescence detected by irradiating the tissue 302 with excitation light, a fluorescence component due to autofluorescence of the tissue 302 and/or a fluorescence component due to an adjacent wavelength region.

The GPGPU board 204 passes color-separated data 414 obtained by executing color separation for the wavelength-coupled data 413 to the CPU 200 via the bus 210 (step S15). The CPU 200 transfers the color-separated data 414 transferred from the GPGPU board 204 to the memory 202 via the bridge 201. The color-separated data 414 is stored in the memory 202.

Figure 22F:
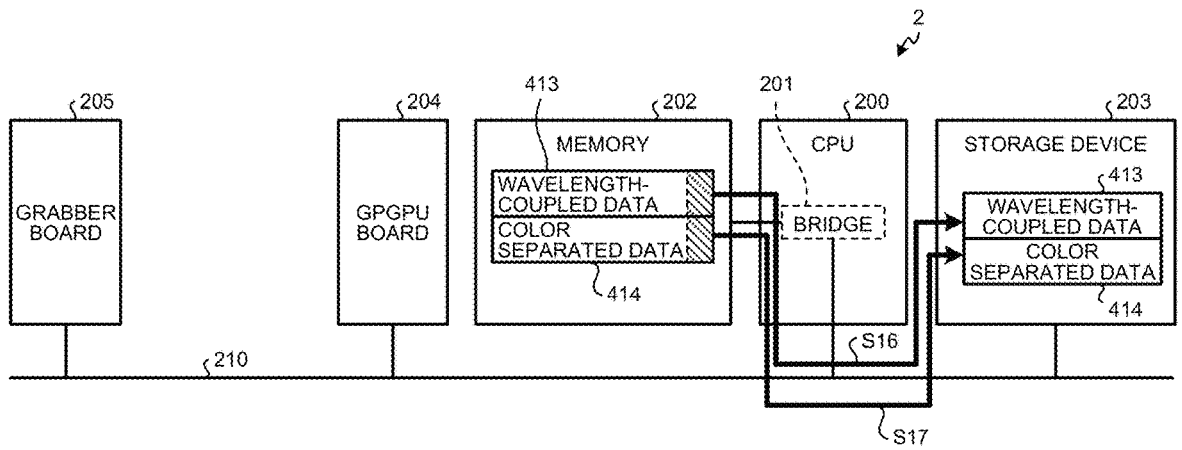
FIG. 22F is a schematic diagram for explaining the flow of the processing according to the embodiment.

As illustrated in FIG. 22F, the CPU 200 reads the wavelength-coupled data 413 and the color-separated data 414 from the memory 202 via the bridge 201 in units of unit rectangular blocks. The CPU 200 transfers the wavelength-coupled data 413 and the color-separated data 414 read from the memory 202 to the storage device 203 via the bus 210

(Step S16, Step S17). The wavelength-coupled data 413 and the color-separated data 414 are stored in the storage device 203 in units of unit rectangular blocks (corresponding to step S108 in FIG. 11).

The wavelength-coupled data 413 and the color-separated data 414 are respectively stored in the storage device 203 in, formats illustrated in the section (a) of FIG. 21B.

(3-4. Data Format Example)

Subsequently, an example of data formats of the wavelength-coupled data 413 and the color-separated data 414 stored in the storage device 203 is explained.

(3-4-1. Data Format Example According to the Existing Technique)

FIG. 23 is a diagram illustrating an example of a data format according to the existing technique. In FIG. 23, data includes a header portion, a wavelength portion, and a main body portion.

The header portion includes items of an identifier, a version, width (pixel), height (pixel), and the number of wavelength CHs. A blank field is provided in the header portion as a spare. In the identifier, a data type is a fixed-length character string "char" and a data length is 4 bytes. As each of the version, the width (pixel), the height (pixel), and the number of wavelength CHs, a data type is a numerical data type "int" and a data length of 4 bytes. The width (pixel) is a fixed value and the height (pixel) is a hardware-dependent value. The number of wavelength CHs is a value determined by imaging conditions.

In the wavelength portion, a corresponding wavelength of wavelength CHs in which a data type is a numerical data type "int" and a data length is 4 bytes is stored. A number #1 is a minimum wavelength and a number #n is a maximum wavelength. Between the minimum wavelength and the maximum wavelength, the wavelengths of the wavelength CHs are indicated in correlation with numbers.

The main body portion stores data (luminance values) for each of lines, pixels, and wavelength CHs. The data of the main body portion is repetitive data repeated for each of lines, pixels, and wavelength CHs. In the data of the main body portion, a data type is a single-precision floating-point type "float" and a data length is 4 bytes (32 bits).

(3-4-2. Data Format Example According to the Embodiment)

FIG. 24 is a diagram illustrating an example of a data format according to the embodiment. In FIG. 24, in the data, a scaling factor portion is added to the data format illustrated in FIG. 23 and the data type of the main body portion is changed. Since the header and the wavelength portion are the same as the data format according to the existing technique illustrated in FIG. 23, explanation the header and the wavelength portion is omitted here.

The scaling factor stores a conversion coefficient into luminance for the wavelength CHs stored in the main body portion. A coefficient for the wavelength CHs is stored as data in which a data type is a single-precision floating-point type "float" and a data length is 4 bytes (32 bits). A number #1 is a minimum wavelength, a number #n is a maximum wavelength and the wavelength CHs are allocated between the minimum wavelength and the maximum wavelength in correlation with numbers. Coefficients are respectively stored for the wavelength CHs from the minimum wavelength to the maximum wavelength.

As in the data format according to the existing technique illustrated in FIG. 23, the main body portion stores data (luminance values) for each of lines, pixels, and wavelength CHs. The data of the main body portion is repetitive data repeated for each of lines, pixels, and wavelength CHs. In the embodiment, in the data of the main body portion, a data type is an integer type "ushort (unsigned short)" and a data length is 2 bytes (8 bits).

As explained above, in the embodiment, the data for each of lines, pixels, and wavelength CHs stored as data in which a data length by the single-precision floating-point type "float" is four bytes in the existing technique is divided into a scaling factor (coefficient) and a main body portion and stored. At this time, the scaling factor is stored as data in which a data length by the single-precision floating-point type "float" of 4 bytes and the data for each of lines, pixels, and wavelength CHs in the main body portion is stored as data in which a data length by the integer type "ushort" is 2 bytes.

When data is used, accuracy of original data can be restored by multiplying the data of the main body portion by the coefficient corresponding to the wavelength CH in the scaling factor.

As described above, by dividing the data into the coefficient and the main body portion and setting the data length of the data stored in the main body portion shorter than the data length of the coefficient, it is possible to reduce an amount of data to be stored.

Note that the data format applicable to the embodiment is not limited to the example illustrated in FIG. 24. For example, a negative value may be able to be expressed by dividing the data for each of lines, pixels, and wavelength CHs into a scaling factor (coefficient) by data in which a data length by a single-precision floating-point type "float" is 4 bytes, an offset value in which a data length by an integer type "ushort" is 2 bytes, and a main body portion (data for each of lines, pixels, and wavelength CHs) in which a data length by an integer type "ushort" is 2 bytes.

As a storage format of image data, a BSQ (Band Sequential) format in which image data is stored band by band is known. In this BSQ format, image data is stored in a file at bit depth at the time of acquisition. In the case of the technical field according to the embodiment, it is necessary to store data at a bit depth deeper than the bit depth at the time of data acquisition from the viewpoint of quantification of the number of antibodies and the like. Therefore, the BSQ format is not satisfactory in terms of bit accuracy.

4. Effects According to the Embodiment

Subsequently, effects according to the embodiment is explained. In the embodiment, as explained with reference to FIGS. 20, 21A, 21B, 22A, 22B, 22C, 22D, 22E, and 22F, the spectral data (x, λ) can be stored and saved in units of unit rectangular blocks. Therefore, it is possible to always save the data at a predetermined data size. By fixing the data size of storage, a unit of processing in a later stage such as color separation is determined and processing in the later stage is facilitated.

As explained with reference to FIG. 24, in the embodiment, the data in which the data length by the single-precision floating-point type "float" is 4 byes for each of lines, pixels, and wavelength CHs with an increased data size is divided into the scaling factor (coefficient) for each of spectral wavelengths and the main body portion and saved. The scaling factor is the data in which the data length by the single-precision floating-point type "float" is 4 bytes and the main body portion is the data in which the data length by the integer type "ushort" is 2 bytes. Consequently, an amount of data to be saved can be reduced. Since a data size per one data is suppressed, treatment is facilitated in later stage processing such as color separation, data transfer, and the like.

Furthermore, by setting the arrangement order of the data in the unit rectangular block serving as the processing unit to "the number of pixels per one line x the number of lines" and connecting this for the number of spectral wavelengths, it is possible to improve efficiency in terms of color separation, compression processing, memory access, and the like in the later stage. The number of antibodies and the like can be quantified.

For example, in an image compression format represented by JPEG (Joint Photographic Experts Group), JPEG2000, HEVC (High Efficiency Video Codec), or the like, an image to be compressed is based on two-dimensional information in image order, that is, width×height. According to the embodiment, since the spectral data (x, λ) is converted into the two-dimensional information by the width (position on line) and the height (line), the compression processing is easy.

According to the embodiment, as explained with reference to FIG. 17, for example, the image processing by the two-dimensional information by the fluorescence of the tissue 302 on the slide glass 300 can be executed by reading the pixel data according to the memory access direction in the storage section 21. Therefore, it is possible to increase speed of memory access for image processing. Further, since the frame according to the embodiment includes the two-dimensional information by the fluorescence of the tissue 302 on the slide glass 300, image processing for the two-dimensional information can be executed in parallel. Therefore, for example, parallel processing by conversion of a processor for image processing into multiple cores becomes possible and it is possible to further increase the speed of processing.

As an example, a time required to create a unit block (in the case of the embodiment, the block including the unit rectangular block for the number of wavelength CHs) is shortened as follows in the embodiment compared with the existing technique as an actual measurement example.

An excitation wavelength was reduced from 405 (nm): 467 (ms) to 345 (ms)
An excitation wavelength was reduced from 488 (nm): 382 (ms) to 336 (ms)
An excitation wavelength was reduced from 532 (nm): 333 (ms) to 249 (ms)
An excitation wavelength was reduced from 638 (nm): 224 (ms) to 168 (ms)

In the actual measurement example, whereas a time required for wavelength coupling is 345 (ms) in the existing technique, the time is $3 \times 10^{-6}$ (ms) in the embodiment and is reduced to approximately $1 \times 10^8$ times.

Note that the effects described in this specification are only illustrations and are not limited. Other effects may be present.

Note that the present technique can also take the following configurations.

(1) A data generation method comprising:
an imaging step of imaging, for each of lines for scanning an imaging target, a plurality of fluorescence images generated by the imaging target for each of a plurality of fluorescence wavelengths and acquiring data of the captured plurality of fluorescence images in arrangement order of the lines; and
a rearrangement step of changing the arrangement order of the data of the plurality of fluorescence images acquired in the imaging step from the arrangement order of the lines to an arrangement order for each of the plurality of fluorescence wavelengths.

(2) The data generation method according to the above (1), wherein
the imaging step includes
acquiring the data of the plurality of fluorescence images in arrangement order based on a combination of a plurality of pixels per the line and the plurality of fluorescence wavelengths, and
the rearrangement step includes
changing the arrangement order of the data of the plurality of fluorescence images acquired in the imaging step to the arrangement order based on a combination of the plurality of pixels per the line and a plurality of the lines by the scanning.

(3) The data generation method according to the above (1) or (2), further comprising
a storing step of storing, in a storage medium, the data of the plurality of fluorescence images, the arrangement order of which being changed in the rearrangement step.

(4) The data generation method according to the above (3), further comprising
a dividing step of dividing each of the data of the plurality of fluorescence images into a main body portion and a coefficient portion including a coefficient for the main body portion, wherein
the storing step includes
storing, in the storage medium, the data of the plurality of fluorescence images divided into the coefficient portion and the main body portion in the dividing step.

(5) The data generation method according to the above (4), wherein
data included in the main body portion have a bit length shorter than the coefficient included in the coefficient portion.

(6) The data generation method according to the above (4) or (5), wherein
the dividing step includes
further dividing, from the data of the plurality of fluorescence images, an offset portion for representing a negative value, and
the storing step includes
storing, in the storage medium, the data of the plurality of fluorescence images divided into the main body portion, the coefficient portion, and the offset portion in the dividing step.

(7) The data generation method according to any one of the above (3) to (6), wherein
the storing step includes
storing, in the storage medium, the data of the plurality of fluorescence images for each of blocks having a fixed size.

(8) The data generation method according to the above (7), wherein
the storing step includes
storing, in the storage medium, the data of the plurality of fluorescence images for each of the blocks collected for each of channels of the respective plurality of fluorescence wavelengths.

(9) The data generation method according to any one of the above (3) to (8), further comprising
a coupling step of reading the data of the plurality of fluorescence images stored in the storage medium from the storage medium for each of fluorescence wavelengths included in the plurality of fluorescence wavelengths and coupling the data.
(10) The data generation method according to any one of the above (3) to (9), further comprising
a separation step of separating components of autofluorescence by the imaging target and/or fluorescence of each of the data of the plurality of fluorescence images from the data of the plurality of fluorescence images stored in the storage medium.
(11) The data generation method according to any one of the above (3) to (10), wherein
the storing step includes
storing the plurality of fluorescence images in the storage medium while connecting the plurality of fluorescence wavelengths in order.
(12) A fluorescence observation system comprising:
an imaging section configured to image, for each of lines for scanning an imaging target, a plurality of fluorescence images generated by the imaging target for a respective plurality of fluorescence wavelengths and acquire data of the captured plurality of fluorescence images in arrangement order of the lines;
a rearrangement section configured to change the arrangement order of the data of the plurality of fluorescence images acquired by the imaging section from the arrangement order of the lines to an arrangement order for each of the plurality of fluorescence wavelengths; and
an image processing section configured to perform image processing for the data of the plurality of fluorescence images, the arrangement order of which being changed by the rearrangement section.
(13) The fluorescence observation system according to the above (12), further comprising
a storage section configured to store, in a storage medium, the data of the plurality of fluorescence images, the arrangement order of which being changed by the rearrangement section.
(14) The fluorescence observation system according to the above (13), wherein
the image processing section performs
image processing for reading the data of the plurality of fluorescence images stored in the storage medium from the storage medium for each of fluorescence wavelengths included in the plurality of fluorescence wavelengths and coupling the data.
(15) The fluorescence observation system according to the above (13) or (14), wherein
the image processing section performs
image processing for separating components of autofluorescence by the imaging target and/or fluorescence of each of the data of the plurality of fluorescence images from the data of the plurality of fluorescence images stored in the storage medium.
(16) An information processing apparatus comprising:
a rearrangement section configured to change arrangement order of data of a plurality of fluorescence images output by an imaging section from arrangement order of lines to arrangement order for each of a plurality of fluorescence wavelengths, the imaging section imaging, for each of the lines for scanning an imaging target, the plurality of fluorescence images generated by the imaging target for each of a plurality of fluorescence wavelengths and acquiring the data of the captured plurality of fluorescence images in the arrangement order of the lines; and
an image processing section configured to perform image processing for the data of the plurality of fluorescence images, the arrangement order of which being changed by the rearrangement section.
(17) The information processing apparatus according to the above (16), further comprising
a storage section configured to store, in a storage medium, the data of the plurality of fluorescence images, the arrangement order of which being changed by the rearrangement section.
(18) The information processing apparatus according to the above (17), wherein
the image processing section performs
the image processing for reading the data of the plurality of fluorescence images stored in the storage medium from the storage medium for each of fluorescence wavelengths included in the plurality of fluorescence wavelengths and coupling the data.
(19) The information processing apparatus according to the above (17) or (18), wherein
the image processing section performs
the image processing for separating components of autofluorescence by the imaging target and/or fluorescence of each of the data of the plurality of fluorescence images from the data of the plurality of fluorescence images stored in the storage medium.

REFERENCE SIGNS LIST

1 OBSERVATION UNIT
2 PROCESSING UNIT
10 EXCITATION SECTION
20 SAMPLE STAGE
21 STORAGE SECTION
22 DATA CALIBRATION SECTION
23 IMAGE FORMING SECTION
30 SPECTRAL IMAGING SECTION
32, 32a, 32b IMAGING ELEMENT
200 CPU
201 BRIDGE
202 MEMORY
203 STORAGE DEVICE
302 TISSUE
400, 401 FRAME

The invention claimed is:
1. A data generation method, comprising:
scanning a plurality of lines of an imaging target;
imaging, for the scanned plurality of lines, a plurality of fluorescence images, wherein the imaging target generates the plurality of fluorescence images for a plurality of fluorescence wavelengths; and
acquiring data of the imaged plurality of fluorescence images in a first arrangement order of the plurality of lines, wherein the first arrangement order is based on a combination of a plurality of pixels for each of the plurality of lines and the plurality of fluorescence wavelengths; and
changing the first arrangement order of the data of the plurality of fluorescence images to a second arrangement order for each of the plurality of fluorescence wavelengths, wherein the second arrangement order is based on a combination of the plurality of pixels of each of the plurality of lines and the plurality of the lines.

2. The data generation method according to claim 1, further comprising:
  storing, in a storage medium, the data of the plurality of fluorescence images in the second arrangement order.
3. The data generation method according to claim 2, further comprising:
  dividing the data of the plurality of fluorescence images into a main body portion and a coefficient portion, wherein
    the coefficient portion includes a coefficient associated with the main body portion, and
  storing, in the storage medium, the coefficient portion and the main body portion.
4. The data generation method according to claim 3, wherein
  a bit length of data of the main body portion is shorter than a bit length of the coefficient of the coefficient portion.
5. The data generation method according to claim 3, further comprising:
  dividing the data of the plurality of fluorescence images into an offset portion, wherein the offset portion represents a negative value, and
  storing, in the storage medium, the main body portion, the coefficient portion, and the offset portion.
6. The data generation method according to claim 2, further comprising:
  storing, in the storage medium, the data of the plurality of fluorescence images based on a plurality of blocks, wherein
    each of the plurality of blocks has a fixed size.
7. The data generation method according to claim 6, wherein
  each of the plurality of blocks corresponds to each of a plurality of channels, and
    the plurality of channels corresponds to a fluorescence wavelength of the plurality of fluorescence wavelengths.
8. The data generation method according to claim 2, further comprising:
  reading, from the storage medium, a first piece of the data of the plurality of fluorescence images stored in the storage medium for a first fluorescence wavelength of the plurality of fluorescence wavelengths, and a second piece of the data of the plurality of fluorescence images stored in the storage medium for a second fluorescence wavelength of the plurality of fluorescence wavelengths; and
  coupling the first piece of the data of the plurality of fluorescence images and the second piece of the data of the plurality of fluorescence images.
9. The data generation method according to claim 2, further comprising:
  separating a fluorescence component from the data of the plurality of fluorescence images stored in the storage medium, wherein the fluorescence component is based on autofluorescence by the imaging target.
10. The data generation method according to claim 2, further comprising:
  storing, in the storage medium, the plurality of fluorescence images based on connecting the plurality of fluorescence wavelengths in order.
11. A fluorescence observation system, comprising:
  a scanning mechanism configured to scan a plurality of lines of an imaging target;
  an imaging section configured to:
    image, for the scanned plurality of lines, a plurality of fluorescence images, wherein the imaging target generates the plurality of fluorescence images for a plurality of fluorescence wavelengths; and
    acquire data of the imaged plurality of fluorescence images in a first arrangement order of the plurality of lines, wherein the first arrangement order is based on a combination of a plurality of pixels for each of the plurality of lines and the plurality of fluorescence wavelengths;
  a rearrangement section configured to change the first arrangement order of the data of the plurality of fluorescence images to a second arrangement order for each of the plurality of fluorescence wavelengths, wherein the second arrangement order is based on a combination of the plurality of pixels of each of the plurality of lines and the plurality of the lines; and
  an image processing section configured to perform image processing for the data of the plurality of fluorescence images in the second arrangement order.
12. The fluorescence observation system according to claim 11, further comprising:
  a storage section configured to store, in a storage medium, the data of the plurality of fluorescence images in the second arrangement order.
13. The fluorescence observation system according to claim 12, wherein
  the image processing section is further configured to:
    read, from the storage medium, a first piece of the data of the plurality of fluorescence images stored in the storage medium for a first fluorescence wavelength of the plurality of fluorescence wavelengths, and a second piece of the data of the plurality of fluorescence images stored in the storage medium for a second fluorescence wavelength of the plurality of fluorescence wavelengths; and
    couple the first piece of the data of the plurality of fluorescence images and the second piece of the data of the plurality of fluorescence images.
14. The fluorescence observation system according to claim 12, wherein
  the image processing section is further configured to
    separate a fluorescence component from the data of the plurality of fluorescence images stored in the storage medium, wherein the fluorescence component is based on autofluorescence by the imaging target.
15. An information processing apparatus comprising:
  a rearrangement section configured to change a first arrangement order of data of a plurality of fluorescence images output by an imaging section to a second arrangement order for each of a plurality of fluorescence wavelengths, wherein
    a scanning mechanism scans a plurality of lines of an imaging target,
    the imaging section images, for the scanned plurality of lines of the imaging target, the plurality of fluorescence images and acquires the data of the imaged plurality of fluorescence images in the first arrangement order of the plurality of lines,
    the imaging target generates the plurality of fluorescence images,
    the first arrangement order is based on a combination of a plurality of pixels for each of the plurality of lines and the plurality of fluorescence wavelengths, and
    the second arrangement order is based on a combination of the plurality of pixels of each of the plurality of lines and the plurality of the lines; and an image processing section configured to perform image processing for the data of the plurality of fluorescence images in the second arrangement order.

16. The information processing apparatus according to claim 15, further comprising:
a storage section configured to store, in a storage medium, the data of the plurality of fluorescence images in the second arrangement order.

17. The information processing apparatus according to claim 16, wherein
the image processing section is further configured to:
read, from the storage medium, a first piece of the data of the plurality of fluorescence images stored in the storage medium for a first fluorescence wavelength of the plurality of fluorescence wavelengths, and a second piece of the data of the plurality of fluorescence images stored in the storage medium for a second fluorescence wavelength of the plurality of fluorescence wavelengths; and
couple the first piece of the data of the plurality of fluorescence images and the second piece of the data of the plurality of fluorescence images.

18. The information processing apparatus according to claim 16, wherein
the image processing section is further configured to:
separate a fluorescence component from the data of the plurality of fluorescence images stored in the storage medium, wherein the fluorescence component is based on autofluorescence by the imaging target.

* * * * *